(12) United States Patent
Jolaeimoghaddam et al.

(10) Patent No.: US 12,514,641 B2
(45) Date of Patent: Jan. 6, 2026

(54) SENSOR-FREE FORCE AND POSITION CONTROL OF TENDON-DRIVEN CATHETERS THROUGH INTERACTION MODELING

(71) Applicant: Hepius Medical Inc., Montreal (CA)

(72) Inventors: Mohammadtaghi Jolaeimoghaddam, Montreal (CA); Seyed Amir Hooshiar Ahmedi, Montreal (CA); Javad Dargahi, Montreal (CA)

(73) Assignee: Hepius Medical Inc., Montreal (CA)

( * ) Notice: Subject to any disclaimer, the term of this patent is extended or adjusted under 35 U.S.C. 154(b) by 1033 days.

(21) Appl. No.: 17/647,673

(22) Filed: Jan. 11, 2022

(65) Prior Publication Data

US 2022/0218418 A1 Jul. 14, 2022

Related U.S. Application Data

(60) Provisional application No. 63/136,100, filed on Jan. 11, 2021.

(51) Int. Cl.
| | | |
|---|---|---|
| *A61B 34/10* | (2016.01) | |
| *A61B 34/00* | (2016.01) | |
| *A61B 34/30* | (2016.01) | |
| *A61B 34/32* | (2016.01) | |
| *A61B 34/37* | (2016.01) | |
| *A61B 90/00* | (2016.01) | |

(52) U.S. Cl.
CPC .............. *A61B 34/10* (2016.02); *A61B 34/25* (2016.02); *A61B 34/32* (2016.02); *A61B 34/37* (2016.02); *A61B 34/71* (2016.02); *A61B 90/06* (2016.02); *A61B 2034/102* (2016.02); *A61B 2034/107* (2016.02); *A61B 2034/301* (2016.02); *A61B 2034/715* (2016.02); *A61B 2090/062* (2016.02); *A61B 2090/064* (2016.02)

(58) Field of Classification Search
CPC ......... A61B 34/10; A61B 34/25; A61B 34/32; A61B 34/37; A61B 34/71; A61B 90/06; A61B 18/02; A61B 18/12; A61M 25/0147
See application file for complete search history.

(56) References Cited

U.S. PATENT DOCUMENTS

| | | | | |
|---|---|---|---|---|
| 2011/0319714 A1* | 12/2011 | Roelle | ................. | A61B 1/0051 |
| | | | | 600/118 |
| 2015/0088161 A1* | 3/2015 | Hata | .................... | A61B 1/0016 |
| | | | | 606/130 |

FOREIGN PATENT DOCUMENTS

| | | | | | |
|---|---|---|---|---|---|
| CN | 105690388 A | * | 6/2016 | ............ | B25J 9/1694 |
| CN | 107414826 B | * | 3/2020 | ............ | B25J 9/1664 |

* cited by examiner

*Primary Examiner* — Bijan Mapar
(74) *Attorney, Agent, or Firm* — FASKEN MARTINEAU DUMOULIN LLP

(57) ABSTRACT

A method and system for controlling a force applied by a tip of a tendon-driven steerable catheter to a tissue of a body part through position control of the catheter. A forward force-contact model determines a desired indentation depth from a desired force and an inverse kinematic model determines a desired configuration of the catheter system based on the desired indentation depth of the tip. A feedback control loop determines an actual indentation depth based on an actual position of the tip within the tip and a position of the tip in free space corresponding to an actual configuration of the catheter and estimates an actual force applied on said tissue based on said actual indentation depth.

20 Claims, 16 Drawing Sheets

SENSOR-FREE FORCE AND POSITION CONTROL OF TENDON-DRIVEN CATHETERS THROUGH INTERACTION MODELING

TECHNICAL FIELD

The present disclosure relates to methods, systems and apparatuses for force control of a medical instrument. In particular, the present disclosure relates to the control of the force applied by a steerable tendon-driven catheter system on a tissue of a body part through a learning-based position control of the catheter.

BACKGROUND

Surgical ablation is one of favorable options for ventricular arrhythmias. In ablation procedures, the ventricular muscles causing undesired pulses or movement in the heart are disabled through freezing (cryo-ablation), burning (radio-frequency ablation) or any other adequate method. One of the most favorable ablation modalities is radiofrequency ablation (RFA). During RFA ablation, ablation catheters are inserted to the patient's vessels and are steered toward the heart chambers to perform radiofrequency ablation. Steerable catheters are long flexible devices with an RF antenna at the tip that facilitate the delivery of RF waves for RFA ablations. Such devices are widely used in cardiology, neurology, and endovascular minimally invasive surgery, diagnosis, and treatment. A steerable catheter is generally comprised of a shape-controllable tip portion (4-10 cm), a non-steerable body (80-150 cm), and a control handle.

For more robust and dexterous manipulation of the catheters inside the atria, tendon-driven catheters were developed. Generally, in tendon-driven catheters, the tip is connected to a series of parallel tendons which are aligned with the catheter's body and at the other end, are connected to motors. The motors change the length of the tendons within the catheter that consequently, change the position and orientation of the tip.

Studies have shown that maintaining contact force between 0.1-0.3 N, is necessary for effective ablation and to avoid tissue perforation. However, with the state-of-the-art robotic catheter intervention (RCI) systems, surgeons lose the direct touch on the catheter and are less situation-aware of the catheter-tissue interaction forces. Additionally, with the emergence of semi-autonomous RCI, the role of force-estimation methods has become more prominent, as the need for force control of the catheter has increased. To this end, researchers have proposed various force estimation methods on flexible catheters. While mechanistic models offer high accuracy and mechanical plausible results, they are often computationally expensive and sensitive to nonlinearities such as dead-zone and material hyper elasticity. On the other hand, heuristic models are often computationally fast and easy to implement. Nevertheless, training of the models and physical interpretation of the model parameters is demanding. Moreover, utilization of sensors on the catheter is not favorable as it complicates the manufacturing process, limits the range of motion of the catheters, and increases the cost of disposal catheters.

Sensor-free or sensor less force estimation methods have also been developed. Such methods may rely on shape sensing of the catheter and relating the tip forces on it. The shape sensing necessitates utilization of image processing or embedding sensors in the catheter body. Studies have shown that shape-based methods may be highly sensitive to the shape estimation errors.

Therefore, there is a need to control a force applied by a sensor-free tendons-driven steerable catheter on a tissue of a body part by control of the position of the catheter.

SUMMARY

A force control through position is disclosed.

According to a first broad aspect, there is provided a method for applying a desired force to a body part, the method comprising: receiving the desired force to be applied by a tip of a medical instrument to a tissue of the body part, the medical instrument comprising a plurality of tendons embedded therein for controlling a position of the tip, the tip being at an initial point of contact with said tissue; determining a desired indentation depth of the tip of the medical instrument corresponding to said desired force using a first force-contact model of the tissue; determining a desired position for the tip of the medical instrument based on the desired indentation depth; determining a desired configuration of the medical instrument based on the desired position using a first kinematic model, the desired configuration comprising an identification of at least a given one of the tendons and for each of the at least the given one of the tendons, a desired length and a desired tension; activating a control mechanism to manipulate the at least the given one of the tendons to setup the desired configuration; measuring an actual configuration of the medical instrument comprising an actual length and an actual tension for each of the at least the given one of the tendons; when at least one of the actual length is different from the desired length and the actual tension is different from the actual tension: determining a corrected desired configuration based on the actual length, the actual tension and a predefined position of the tip in free space corresponding to the actual length and the actual tension; and activating the control mechanism to manipulate the at least a given one of the tendons to setup the corrected desired configuration.

In one embodiment, the step of determining the corrected desired configuration comprises: determining an actual position of the tip using a second kinematic model; determining an actual indentation depth using the actual position and the predefined position of the tip in free space corresponding to the actual length and the actual tension; determining an estimated force corresponding to the actual indentation depth using a second force-contact model of the tissue; correcting the desired force using the estimated force, thereby obtaining a corrected desired force; determining a corrected desired indentation depth of the tip of the medical instrument corresponding to the corrected desired force using the first force-contact model of the tissue; determining a corrected desired position for the tip of the medical instrument based on the corrected desired indentation depth and the actual position of the tip; and determining the corrected desired configuration of the medical instrument based on the corrected desired position using the first kinematic model, the corrected desired configuration comprising a corrected desired length and a corrected desired tension.

In one embodiment, the predefined position of the tip in free space is determined using an artificial intelligence model trained to map positional coordinates of the tip of the medical instrument to tendons lengths and tendons tensions.

In one embodiment, the first force-contact model is a forward force-contact model and the second force contact model is an inverse of the first contact model and wherein the first force contact model is based on a non-linear viscoelastic contact model at an interaction point between the tip of the medical instrument and the tissue using a non-linear element and a plurality of Kevin-Voigts units.

In one embodiment, the first kinematic model is based on an inverse kinematic model and the second kinematic model is a forward kinematic model.

In one embodiment, the first kinematic model is based on an artificial intelligence model comprising: a learning-based classifier trained to map a given position within a task space of the tip of the medical instrument to a class of tendons identifying selected tendons to be manipulated for the tip to reach the given position; a regressor trained to determine a configuration of the medical instrument based on the class of tendons and the given position, the configuration determining a length and a tension of each of the selected tendons identified by the class of tendons to reach the given position.

In one embodiment, the medical instrument is a catheter, and the tendons are internally connected to the tip of the catheter.

In one embodiment, the catheter has a handle, and the control mechanism is located on said handle and wherein the control mechanism comprises one of a knob and a slider for setting a force to be applied by said catheter.

In one embodiment, the handle comprises: one of servomotors and stepper motors for controlling the length and the tension of each of the tendons; and tendons encoders for measuring a current length and a current tension of each of the tendons.

According to a further broad aspect, there is provided a method for applying a force to a body part, the method comprising: receiving a desired force to be applied by a tip of a medical instrument to a tissue of the body part, the medical instrument comprising a plurality of tendons embedded therein for controlling a position of the tip, the tip being at an initial point of contact with said tissue; determining a desired indentation of the tip of the medical instrument relative to said initial contact point based on said desired force using a first force-contact model of the tissue; determining a desired configuration of the medical instrument based on the desired indentation using a first kinematic model, the desired configuration comprising an identification of selected tendons and for each of the selected tendons, a desired length and a desired tension and wherein the desired indentation is provided as input to said first kinematic model; activating a control mechanism to setup the desired configuration; measuring an actual configuration of the medical instrument comprising an actual length and an actual tension of the selected tendons; determining an actual position of the tip of the medical instrument based on said actual configuration using a second kinematic model; estimating an actual indentation within said tissue based on a differential between said actual position of the tip and a position of the tip in free space corresponding to said actual length and said actual tension of the selected tendons; and estimating an actual force applied to said tissue based on the estimated actual indentation.

In one embodiment, the method further comprises activating a control loop to reduce a differential between the desired configuration and the actual configuration.

In one embodiment, the control loop comprises a first loop for inputting a differential between the desired force and the actual force to said first force-contact model of the tissue to output a correction of the desired position of the tip; and a second loop for inputting a differential between the actual position of the tip and the correction of the desired position of the tip to the first kinematic model to output a corrected configuration of the medical instrument.

In one embodiment, the method comprises activating the control mechanism to setup the corrected configuration of the medical instrument.

In one embodiment, the medical instrument is a catheter, and the tendons are internally connected to the tip of the catheter.

According to another broad aspect, there is provided a catheter system having at its distal end a tip and embedding a plurality of tendons for applying a force to a tissue of a body part, the system comprising: a first force-contact model unit for generating a desired indentation depth of the tip of the catheter system from a received desired, wherein the tip is at an initial point of contact with said tissue; a first kinematic model unit for generating a desired configuration from said desired indentation, the desired configuration comprising an identification of selected tendons and for each of the selected tendons, a desired length and a desired tension; a catheter controller for setting up said desired configuration on said catheter system and for measuring an actual configuration of the catheter system wherein said actual configuration comprises an actual length and an actual tension of the selected tendons; a second kinematic model unit for determining an actual position of the tip based on said actual configuration; an indentation determination module for determining an actual indentation depth based on a differential between said actual position of the tip and a position of the tip in free space corresponding to said actual length and said actual tension of the selected tendons; and a second force-contact model unit for estimating an actual force applied to said tissue based on the estimated actual indentation.

In one embodiment, the first force-contact model unit operates in a forward mode, the second force-contact model unit operates in an inverse mode, the first kinematic model unit operates in an inverse mode and the second kinematic model unit operates in a forward mode.

In one embodiment, the first force-contact model unit further receives a differential between the desired force and the actual force to adjust the desired indentation depth.

In one embodiment, the system further comprises a position calculation module for determining a desired position of the tip based on the desired indentation depth.

In one embodiment, the first kinematic model unit further receives a differential between the desired position of the tip and the actual position of the tip to adjust the desired configuration.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
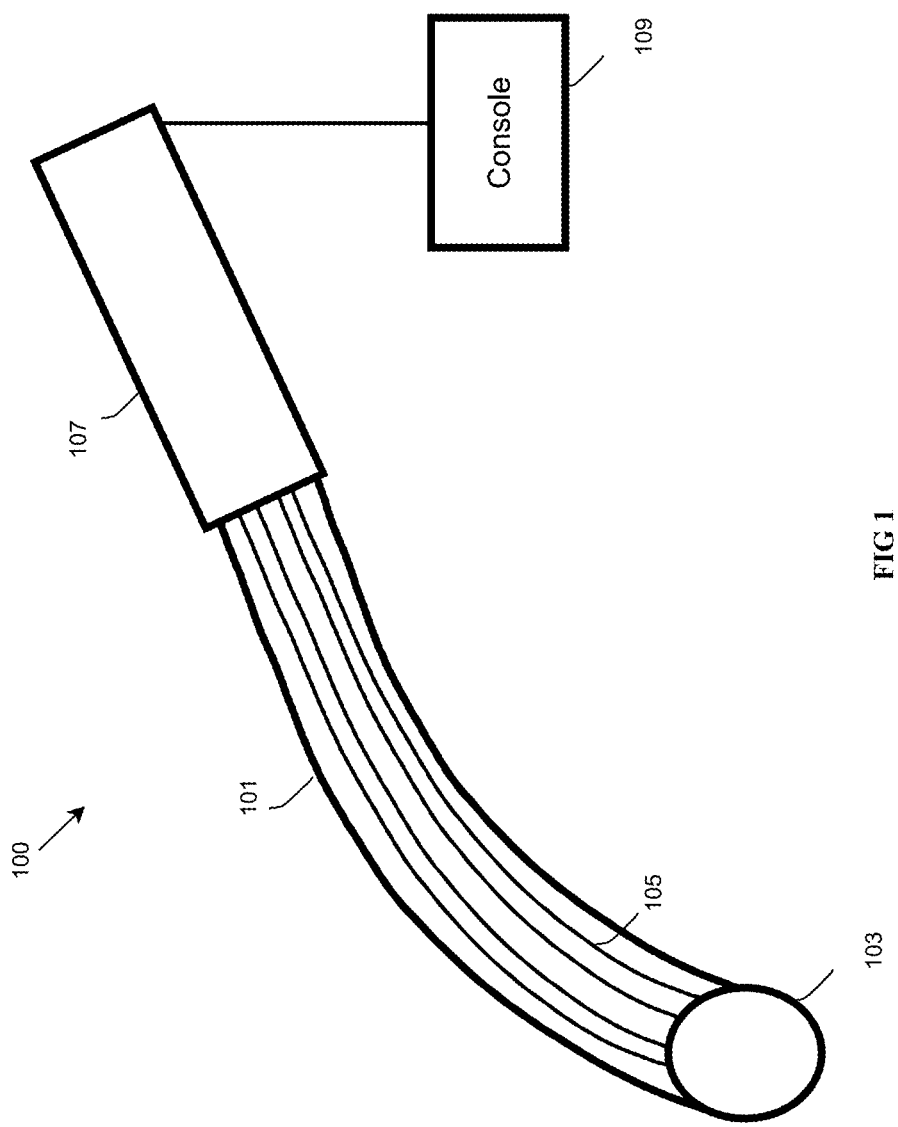
FIG. 1 is an exemplary steerable catheter system in accordance with an embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

FIG. 1 shows an exemplary steerable catheter system 100 that can be used with the teachings of the present disclosure. The steerable catheter system 100 comprises a flexible body 101 having a handle 107 at its proximal end and a tip 103 at its distal end. The flexible body 101 defines an inner side embedding pull-wires, also known as tendons and referred herein individually as tendon 105 or collectively as tendons 105. The tendons 105 are connected on their proximal end to a tendon control mechanism within the handle 107.

In one embodiment, the tendons 105 are attached to one or multiple points along the inner side of the flexible body 101. Such an attachment allows for the control of the position of the tip 103 of the catheter system 100 through a manipulation of the tendons 105. The tendons 105 can as well be attached, on their distal end, to the tip 103.

Embodiments of the present disclosure provide for a plurality of tendons to be embedded within the flexible body 101 to allow for a control of the position of the tip 103 within a body part. The number of tendons within the catheter can be 2 or more tendons. FIG. 1 illustrates an exemplary catheter system 100 embedding four tendons 105.

In one embodiment a second set of tendons terminated midspan of the catheter length can be added. The configuration of the catheter including the number of tendons 105 and the addition or not of midspan-terminated tendons can be set based on a planned trajectory of the catheter or other criteria to optimize its operation. The teachings of the present technology can be applied to any chosen configuration.

In one embodiment, the handle 107 is connected to a console 109 using a wired medium, a wireless medium or a combination thereof. Alternatively, any communication interface can be used between the handle 107 and the console 109 including USB, the family of 802.11 protocols, Bluetooth and other communication protocols known to the person skilled in the art.

In one embodiment, the console 109 is provided as a user interface to acquire user inputs, perform real-time or offline calculations, store data and perform self-calibration and diagnostics on the handle 107. The console 109 may be provided with a display medium, a user interface media, such as a touch screen, a central logic unit, such as a CPU or a GPU, and a storage medium.

Figure 2:
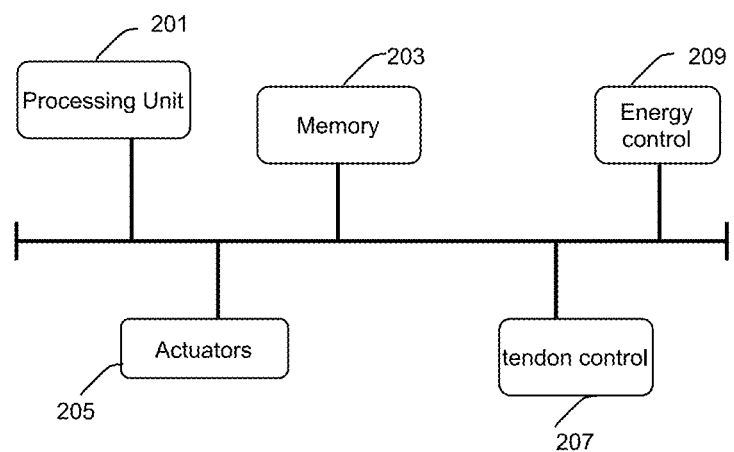
FIG. 2 is a is a block diagram for a catheter controller in accordance with an embodiment.

Embodiments of the present disclosure provide for the handle 107 to house a catheter controller to control and monitor a behavior of the catheter system 100. FIG. 2 illustrates a system diagram for implementing such a catheter controller.

The catheter controller comprises a processing unit 201 for executing instructions or programs stored in memory 203 or received from the console 109. The processing unit 201 can be a microprocessor or any processor device capable of executing the operations of the present technology, such a processor device is well known to those skilled in the art. The system diagram comprises an energy control unit 209 for delivering or withdrawing thermal energy to or from tissues to enable the catheter system 100 to effectuate an ablation during a medical procedure. The energy control unit 209 may be capable of generating and delivering radiofrequency heat to a target point within the body part. The energy control unit 209 may as well be capable of cryogenic cooling.

A tendon control module 207 is also provided in the catheter controller to control and configure the tendons 105. In one embodiment, the proximal ends of the tendons 105 are connected to the tendon control module 207 through actuators 205. The actuators 205 can be electromechanical actuators such as linear or rotary motors or they can be other types of actuators that allow transferring a mechanical force to the tendons 105.

In an embodiment where a rotary motor is provided as actuator, each tendon 105 may be wound around a shaft of a respective motor to enable the tendon control module 207 to configure each of the tendons 105 by setting the length and the tension of each of the tendons 105. In this embodiment, the length of a tendon 105 can be changed by driving the motor to roll in or roll out the tendon 105 wound around the shaft of the motor and the tension can be controlled by controlling the motor torque.

In one embodiment, the length of the tendons refers to the length of the section of the tendons located within the catheter. In another embodiment, the length of the tendons refers to the length of the section of the tendons located outside of the catheter.

In an embodiment where a linear motor is provided as actuator, each tendon 105 can be attached to the shaft and the length of each of the tendons 105 within the catheter can be changed through a linear motion of the shaft and the tension of the tendon 105 can be changed by controlling the motor tension.

Typically, the motors' torque or tension is proportional to their drawn electrical current. In one embodiment, the motors can operate under current control mode to control the tendon tensions.

In one embodiment, the tendon control module 207 comprises a selection component to select a target force or position of the tip 103. The selection component can be a mechanical or an electronic continuous selection component such as a knob or it can be a discrete selection component such as a slider.

The catheter system 100 can estimate, monitor, regulate, control, and/or record the position of the tip of the catheter and contact force between the tip 103 of the catheter system 100 and body tissues. The estimation, monitoring, recording, regulation, and/or control of the catheter's tip force and tip position is performed through software-hardware integration implemented by software or firmware running in the console 109 and in the handle 107. Some functionalities described as being implemented in the handle 107 can, in certain embodiments, be implemented in the console 109 or distributed between the handle 107 and the console 109.

Figure 3:
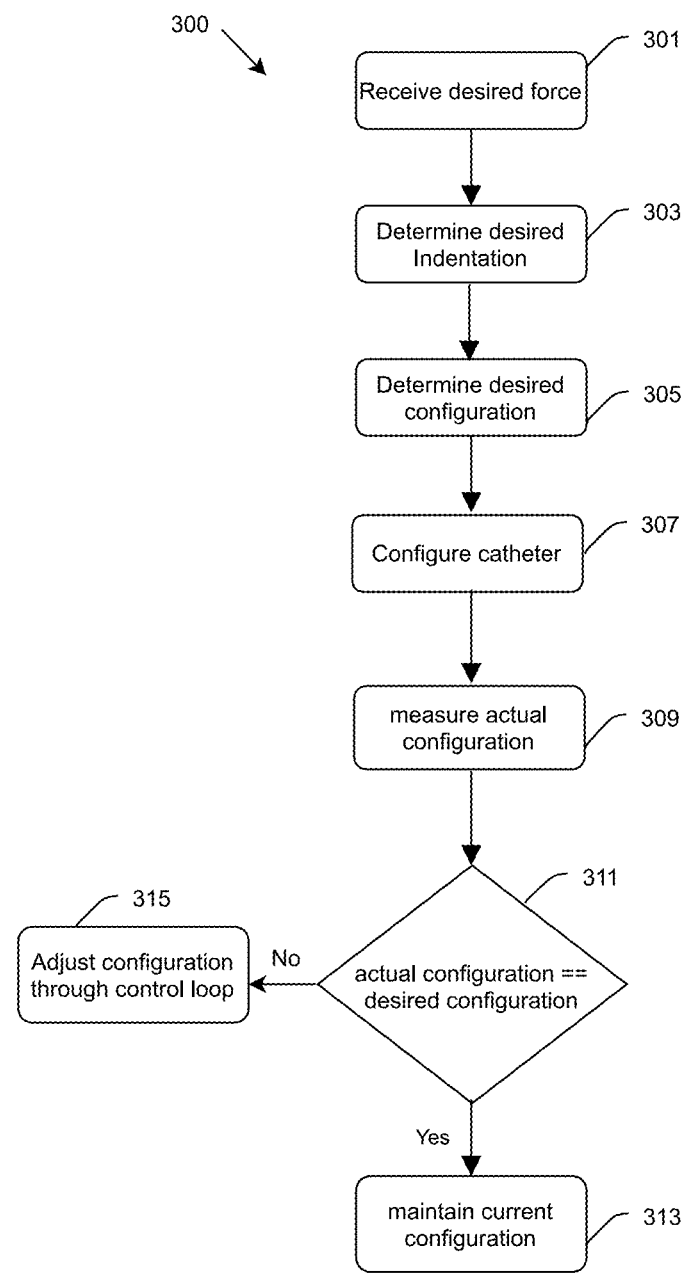
FIG. 3 is a flowchart illustrating a method for contact-force control through position in accordance with an embodiment.

FIG. 3 illustrates one embodiment of a method 300 for controlling a contact-force applied on a tissue of a body part by the tip 103 of the steerable catheter system 100. In operation, the catheter system 100 receives an indication of a desired force to be applied at a contact point on the tissue at step 301. The desired force can be set through the selection component of the tendon control module 207. Alternatively, the desired force can be received from the console 109 through the communication interface between the console 109 and the catheter system 100.

At step 303, a desired indentation depth of the tip 103 is determined. The desired indentation depth refers to a displacement of the tip 103 within the tissue from the contact point on the tissue. In the present disclosure, the force is controlled using a displacement-based model in which a force-contact model of the tissue maps a given force to a given indentation depth of the tip 103 from the contact point. An exemplary force-contact model of the tissue is described below with reference to FIG. 4.

At step 305, a desired configuration of the tendons 105 is determined based on the determined indentation depth. The desired configuration refers to a tendons driving class or tendons class which identifies selected tendons amongst the tendons 105 with each tendon of the selected tendons to be configured to have a specified length and a specified tension. Alternatively, the desired configuration may refer to a respective length and tension for each of the tendons 105 embedded in the catheter system 100.

Embodiments of the present technology provide for a mapping between a given position of the tip 103 and a given configuration of the catheter system 100 using a feedforward (FF) learning-based kinematic model in which, for the given position, the selected tendons are configured to have the specified length and the specified tension for the tip 103 to reach the given position. In one embodiment, the given position can be represented by the determined indentation depth. The details of an exemplary learning-based kinematic model including the tendons driving classes or tendon classes are described hereinafter with reference to FIG. 5.

At step 307, the tendons 105 of the catheter 100 are configured by driving the motors to set the specified length and tension for the selected tendons in order for the tip 103 to reach the desired position as determined by the FF learning-based kinematic model. At step 309, the actual configuration is measured by tendons encoders present within the handle 107 which measures the actual length and tension of the selected tendons. The person skilled in the art will understand that the configuration parameters given by the learning-based kinematic model, when implemented by the catheter 100 inserted in a body part may be different from the actual parameters measured by the tendons encoders. The method 300, at step 311, compares the actual configuration with the desired configuration.

The discrepancies between the desired configuration parameters and the measured or actual configuration parameters will result in a difference between the desired force and an actual force applied on the tissue. Embodiments of the present technology provide for such discrepancies to be corrected by using a control loop to adjust the configuration parameters so as to have the tip 103 apply the desired force on the tissue. In these embodiments, if the comparison performed at step 313 shows that the desired and actual configurations are different, the method 300 adjusts the configuration parameters through the control loop at step 315. The details of the control loop will be described with reference to FIG. 6. If the actual configuration is equal to the desired configuration, the current configuration is maintained to thereby apply the desired force on the tissue.

In one embodiment, the actual configuration is considered different from the desired configuration if a differential between one of the actual configuration parameters and a respective one of the desired configuration parameters exceeds a predefined threshold.

Alternatively, the actual configuration can be considered different from the desired configuration if both of the actual configuration parameters are different from the desired configuration parameters.

Figure 4:
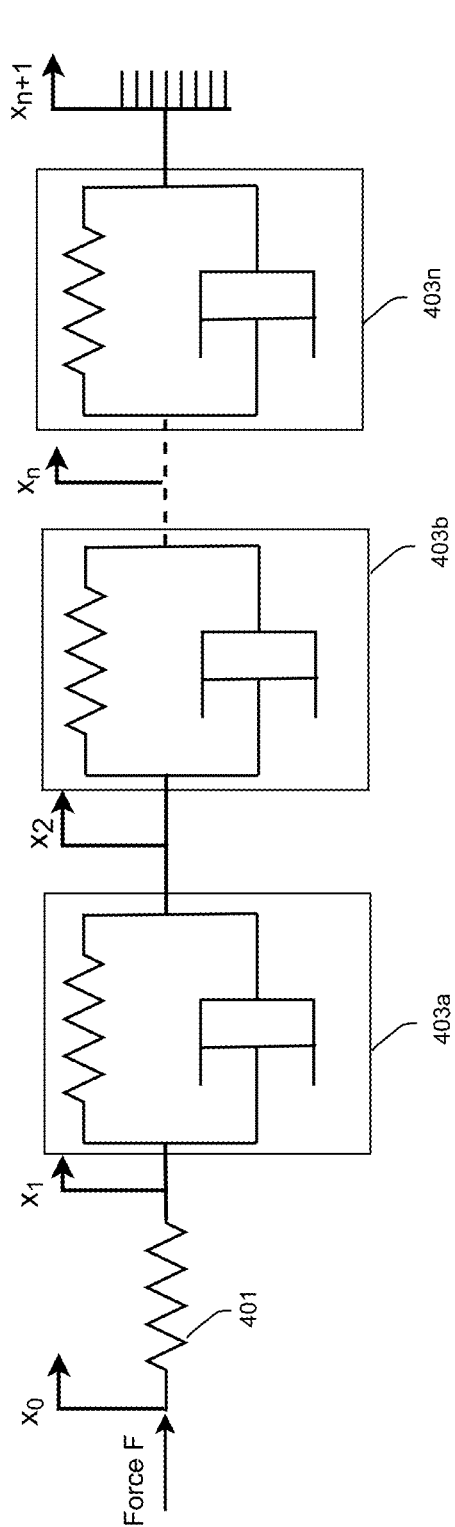
FIG. 4 schematically illustrates a force contact model in accordance with an embodiment.

FIG. 4 illustrates an exemplary force-contact model to estimate and control the contact force at a catheter-tissue interface. In one embodiment, the force-contact model uses a non-linear viscoelastic characterization of the myocardial tissue. In one embodiment, a nonlinear elastic element with parameter $k_0$ and n serial linear Generalized Kelvin-Voigt (n-GKV) units are used. The force-contact model of the present disclosure can be used for any tissue by setting $k_0$ and n according to the tissue to be modeled.

Embodiments of the present technology provide for each of the n-GKV units to be replaced with other forms of nonlinearities, such as exponential, rational, Fourier series or polynomials. Also, since n-GKV represents the mechanical impedance of the interaction, other forms of mechanical impedance can be used to model the contact force at the catheter-tissue interface without departing from the teachings of the present technology.

With reference to FIG. 4, the non-linear elastic element of the force-contact model can be modeled as a power-law spring 401, with the force-length equation described by Eq.A.

$$F = -k_0(x_1 - x_0)^p \qquad (A)$$

The n-GKV units are represented in FIG. 4 as units 403a, 403b and 403n. A GKV unit such as unit 403a is composed of a spring having a stiffness constants $k_i$ and a viscous damper with a viscous constants $c_i$ connected in parallel as shown in FIG. 4. The force balance condition for the i-th GKV unit is represented by equation (B):

$$F = -k_i(x_{i+1} - x_i) - c_i(x'_{i+1} - x'_i) \; i = 1, 2, \ldots n, \qquad (B)$$

subjected to two homogenous Dirichlet and Neumann boundary conditions:

$$x_{n+1}(t) = 0, \; x'_{n+1}(t) = 0;$$

and
the initial conditions:

$$x'_i(0) = 0, \; i = 1, 2, \ldots n.$$

Assuming the model at initial rest with all the springs and dampers at their resting lengths, a system of n ordinary differential equations (ODE) can be formed and re-arranged in the following form:

$$Kx(t) + Cx'(t) = -f(t) \qquad (C)$$

where $K_{n \times n}$ is the stiffness matrix and, $C_{n \times n}$ is the viscous matrix, $x(t)_{n \times 1}$ and $x'(t)_{n \times 1}$ are, respectively, the displacement and velocity vectors and are referred to as displacement state vectors, and $f(t)_{n \times 1}$ is the force vector. The displacement state vectors can be defined as:

$$x(t) = [x_1(t), x_2(t), \ldots, x_n(t)]^T$$

$$x'(t) = [x'_1(t), x'_2(t), \ldots, x'_n(t)]^T$$

and the force vector can be defined as follows:

$$f(t) = [F(t), F(t), \ldots, F(t)]^T$$

where $(.)^T$ denotes the transpose operator.

The elements of stiffness and viscous matrices can be defined as:

$$K_{ij} = \begin{cases} k_i & i = j \\ -k_i & i = j-1 \\ 0 & \text{otherwise} \end{cases} \quad i, j = 1 \ldots n,$$

$$C_{ij} = \begin{cases} c_i & i = j \\ -c_i & i = j-1 \\ 0 & \text{otherwise} \end{cases} \quad i, j = 1 \ldots n.$$

The parameters p and n can be chosen to obtain an optimal model. In one embodiment, the values contained in the table 1 below can be used to obtain an optimal model. Other values for these parameters can be chosen without departing from the scope of the present disclosure.

TABLE 1

| n = 3 p = 5 | | $k_0\left(\dfrac{N}{mm}\right)$ | |
|---|---|---|---|
| | | 0.2212 | |
| $k_1\left(\dfrac{N}{mm}\right)$ | $k_2\left(\dfrac{N}{mm}\right)$ | | $k_3\left(\dfrac{N}{mm}\right)$ |
| 0.5476 | 0.4713 | | 0.7032 |
| $c_1\left(\dfrac{N}{mm \cdot sec}\right)$ | $c_2\left(\dfrac{N}{mm \cdot sec}\right)$ | | $c_3\left(\dfrac{N}{mm \cdot sec}\right)$ |
| 15.9645 | 9.5157 | | 1.7820 |

The representation of the force-contact model of FIG. 4 by equations A and C allows defining a forward model or forward mode of operation in which the displacement $x_0$ can be obtained from the knowledge of the force F(t) and an inverse model, referred to as inverse mode of operation, in which the force f(t) is determined from the displacement state. Equation A can be rearranged as scalar equation D:

$$x_0(t) = x_1(t) + \left(\dfrac{F(t)}{k_0}\right)^{\frac{1}{p}} \qquad (D)$$

Equation C can be rearranged as equation E using the differential definition of x'(t):

$$x(t + \delta t) = x(t) - \delta t C^{-1}(f(t) + Kx(t)) \quad (E)$$

δt being the time step and can be determined in real-time as the absolute time difference between two indentation evaluations. Equation E is a vectorial equation with n independent equations.

In forward mode of operation, with f(t) and contact model parameters K and C known and $x_0, \ldots, x_n$ unknown, the indentation depth $x_0$ can be calculated from simultaneous solution of Equations D and E for a given time period (t, t+δt).

In inverse mode of operation, with the indentation depth $x_0$ and contact model parameters K and C known and f(t) unknown, f(t) can be determined from simultaneous solution of Equations D and E for a given time period (t, t+δt).

Equations D and E form a nonlinear system of equations that may be solved using numerical method. In one embodiment, a fourth order Runge-Kutta (RK4) method can be used to solve the forward model. The RK4 is a numerical method known to those skilled in the art for solving differential equations. Alternatively, a gradient-based solution such as Newton-Raphson method can be used to solve the non-linear system of equations formed by equations D and E.

The force-contact model of the tissue shown in FIG. 4 is used, according to an embodiment, to map a given force presented as input to the model to a displacement of the tip 103 using the force-contact model in forward mode. For example, referring back to FIG. 3, the desired displacement or indentation is determined at step 303 by inputting the desired force to the forward model to obtain the desired indentation.

The force-contact model, when operated in inverse mode, maps a given displacement to a force being applied by the tip 103 on the tissue.

Figure 5:
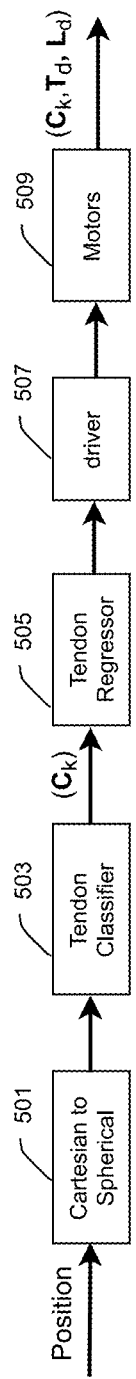
FIG. 5 schematically illustrates a learning-based kinematic model in accordance with an embodiment.

FIG. 5 illustrates an exemplary learning-based kinematic model implemented by the catheter system 100 according to an embodiment of the present disclosure. The kinematic model can be used in a forward mode or in an inverse mode. In the inverse mode, the kinematic model determines the desired length and tension of selected tendons by which the tip 103 of the catheter 100 would reach a desired position P. The position P can be represented by a desired indentation depth. In the forward mode, the learning-based kinematic model determines a position of the tip of the catheter system 100 based on a given length and tension of selected tendons.

According to an embodiment, the position P, when defined in a global cartesian task space, is mapped to a spherical coordinate system at the Cartesian-to-Spherical conversion module 501 of FIG. 5. The person skilled in the art will recognize that the kinematic model can operate in a global cartesian space without departing from the scope of the current disclosure.

Figure 7A:
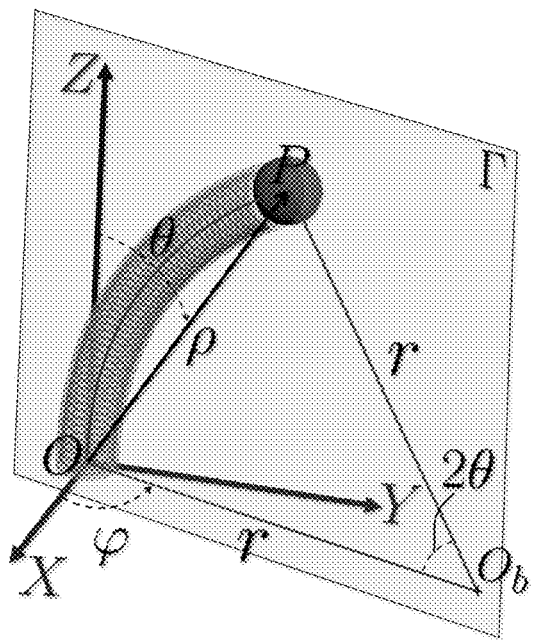
FIG. 7A schematically illustrates a catheter subject to a bending deformation in Cartesian and spherical coordinates in accordance with an embodiment.

The conversion of cartesian coordinates to spherical coordinates is well known to those skilled in the art. FIG. 7A illustrates the representation of the position P in both the cartesian space (x,y,z) and spherical space (ρ, θ, φ). FIG. 7A depicts a representative deformation of the catheter 100, with P being the position of its tip 103, r is the bending radius, Γ is the bending plane, and $O_b$ is the center of the bending arc (OP). An analysis of the dynamic of the catheter system 100 subject to such a deformation results in an equation representing the locus of the tip 103. The locus of the tip 103 defines the theoretical workspace of the tip 103 and can be represented, using the spherical coordinates as:

$$\rho \frac{\theta}{\sin \theta} = \text{constant}.$$

the constant being the length of the catheter system 100.

From the locus expressed in terms of spherical coordinates ρ and θ, it can be deducted that the catheter has two degrees of freedom and that the position of the tip 103 can be fully described using two independent coordinates such as (ρ, φ) or (θ, φ).

As stated earlier, the catheter system 100 is tendon-driven and through the control of the tension and length of the tendons 105 the position and orientation of the tip can be controlled. The feasible workspace of the tip 103 of the catheter system 100 can be defined by the set of positions that the tip 103 can assume through different configurations of the tendons 105.

In one embodiment, the feasible workspace of the tip 103 for the catheter system 100 embedding 4 tendons 105 can be obtained by sequentially pulling the tendons in all the possible dual tendon classification, labeled as tendon classes C1: 1-2, C2: 2-3, C3: 3-4, C4: 4-1, C5: 2-4, C6: 3-1, etc. For example, to obtain a complete feasible workspace, for each Ck: i-j, tendon i would increment for 1 mm (up to 10 mm) while tendon j would complete a 10 mm sweep.

The present disclosure is illustrated with a dual tendon classification in which each tendons class is represented by two selected tendons to be configured, however the teachings of the present disclosure can be applied to any tendon classification.

The complete feasible workspace may exhibit a redundant control space where multiple combinations of lengths and tensions of tendons can result in the tip 103 having a similar position. Embodiments of the present invention provide for such a redundancy to be resolved. In these embodiments four tendon classes $C_{1-4}$ are selected to resolve the control space redundancy. Using these four classes, distinct subspaces for each class can be obtained with each feasible subspace associated to a corresponding tendon class. In these embodiments, the positioning of the tip 103 within a given subspace is dependent on the manipulation of the tendons within the tendon class corresponding to the given subspace. The tendons to be manipulated within a tendon class are referred to herein as selected tendons. For example, tendon class C1, refers to selected tendons 1 and 2 to be manipulated in order to position the tip within the subspace corresponding to C1.

In one embodiment, the kinematic model of FIG. 5 is split into a learning-based tendon classifier 503 and a tendon regressor 505. For a given desired position P, the tendon classifier 503 determines the tendon class or selected tendons to be configured, while the regressor 505 determines the desired length and tension of the selected tendons.

In one embodiment, the tendon classifier 503 implements a support vector machine (SVM) classifier with a linear kernel trained with a dataset of the feasible space containing the spherical coordinates (θ, φ) as the features and the four tendon classes $C_{1-4}$ as the categories. In this embodiment, the tendon classifier 503 maps a given position to a given tendon class. In certain embodiments, the classifier 503 can be implemented using any classification method that allows for that mapping. For example, the SVM classifier can be replaced with an artificial neural networks (ANN), a logistic regression classification (LRC), a decision tree (DT), or ensemble methods such as random forests.

In one embodiment, the tendon regressor 505 is provided to determine the desired length and tension for the selected tendons determined by the tendon classifier 503 using a neural network regression. In this embodiment, individual neural networks, denoted as $NN_k$ for the tendon class $C_k$, can be trained with the classes $C_k$: i-j obtained from the feasible workspace (θ, φ) as input and ($L_i$, $T_i$; $L_j$ $T_j$) as output for the tendon classes, $C_k$: i-j. In addition to the input and output layers, each $NN_k$ network can be implemented with ten hidden layers each having five neurons in a fully connected architecture. It should be understood that other values for the number of layers and neurons can be chosen to implement the neural network regression of the tendon regressor 505.

Embodiments of the present disclosure provide for the tendon regressor 505 to use a training and validation dataset with a given ratio between the training and validation data. The training can be performed using the damped least-square method known as Marquard-Levenberg algorithm or other methods known to those skilled in the art.

The person skilled in the art will recognize that the neural network regression can be replaced with other regression methods such as linear, polynomial, power-law, Fourier series, stepwise regression, Weibull model, ridge regression, lasso regression, ElasticNet or support vector regression without departing from the scope of the invention.

In operation, the learning-based kinematic model of FIG. 5 can map the desired position P to a desired configuration of the identified tendon class. The desired configuration identifies the tendon class Ck and specifies a desired length and a desired tension of the selected tendons in the identified tendon class Ck. In one embodiment, the learning-based kinematic model of FIG. 5 comprises a driver 507 for driving the motors 509 to set the desired length and tension of the selected tendons.

Figure 6:
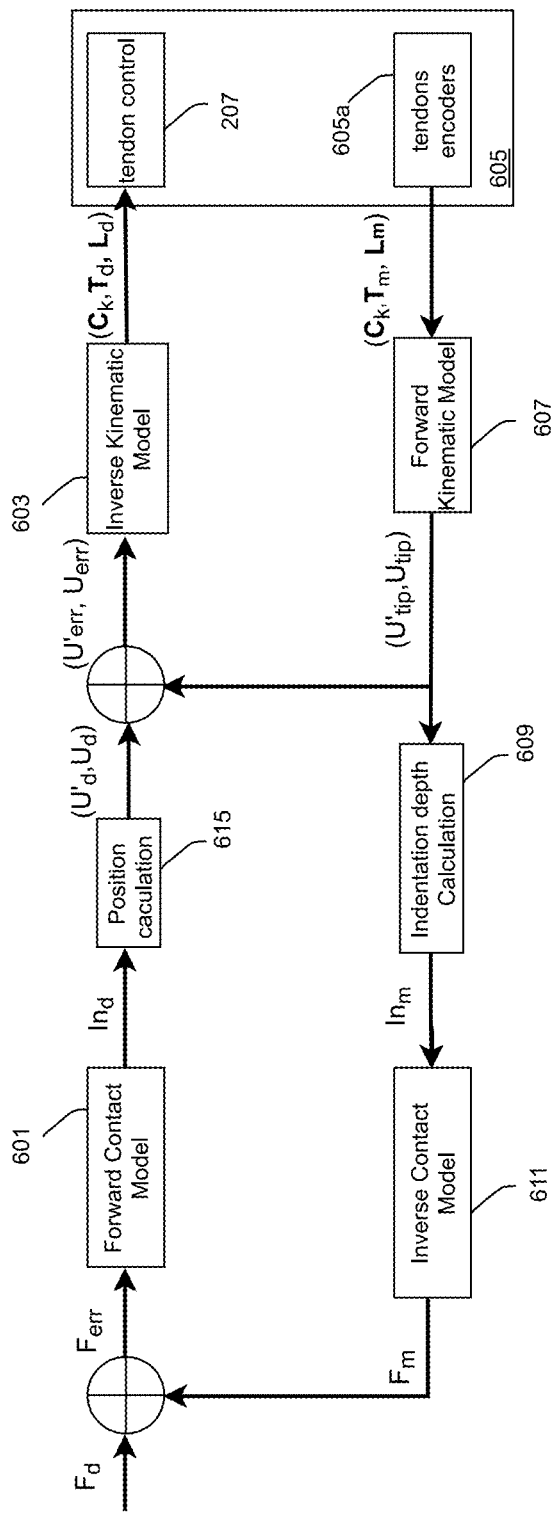
FIG. 6 schematically illustrates a contact-force control scheme in accordance with an embodiment.

Embodiments of the present disclosure provide for the force-contact model of FIG. 4 and the kinematic model of FIG. 5 to be combined to provide a sensor-free contact-force control through position control. FIG. 6 illustrates a contact-force control scheme according to these embodiments.

In one embodiment, the control scheme of FIG. 6, at an initial stage, receives a desired force at a forward contact model 601. The forward contact model 601 implements the catheter-tissue contact model or force-contact model described with reference to FIG. 4 to determine the desired displacement or indentation depth ($In_d$) of the tip 103 from an initial contact point that will produce the desired force. A position calculation module 615 can be used to determine the desired position of the tip 103 based on the desired indentation depth ($In_d$). In one embodiment the position calculation module 615 determines a desired position state ($U'_d$, $U_d$) which includes the position and its derivative from the desired indentation depth based on the coordinates of the initial point of contact.

In one embedment, the desired indentation depth is provided as tip position (0, $In_d$(t), 0) and input to the inverse kinematic model 603. In this embodiment, position calculation from the desired indentation is omitted.

Embodiments of the present disclosure provide for the control scheme of FIG. 6 to be formulated using a position state including only U. In this formulation, the derivative may not be taken into consideration. For example, in a slow-motion situation, the control scheme can only rely on the position state ($U_d$) by omitting the derivative $U'_d$.

The desired position state is presented as input to the inverse kinematic model 603. In this embodiment, the inverse kinematic model 603 implements the kinematic model of FIG. 5, in inverse mode, to determine the desired configuration ($C_k$, $T_d$, $L_d$) from the desired position state ($U'_d$, $U_d$). The desired configuration ($C_k$, $T_d$, $L_d$) is inputted to a catheter controller 605 for setting up the desired configuration on the catheter system 100. The catheter controller 605 is provided to control the configuration and monitor the behavior of the catheter system 100. The catheter controller 605 comprises the tendon control module 207 for selectively driving the motors attached to the tendons 105 to set the desired length and tension for the selected tendons in the identified tendon class Ck.

In one embodiment, the catheter controller 605 monitors the behavior of the catheter system 100 by measuring the actual length and tension of the selected tendons using tendons encoders 605a. The tendons encoders 605a can use the motor shaft position feedback to determine the actual length and tension of the selected tendons and to provide these measurements as input ($C_k$, $T_m$, $L_m$) to the forward kinematic model 607 as part of a feedback control loop. In one embodiment, the feedback control loop is provided to implement the step 315 of FIG. 3 in order to adjust the configuration of the tendons 105 when the actual configuration differs from the desired configuration as stated earlier to thereby control the force applied on the tissue. Any deviation from the desired force can be controlled using the feedback control loop.

It will be understood by a person skilled in the art that, at the initial stage of operation, the values produced by the feedback control loop can be equated to zero which result in $F_{err}=F_d$ and ($U'_{err}$, $U_{err}$)=($U'_d$, $U_d$).

In one embodiment, the forward kinematic model 607 implements the kinematic model of FIG. 5 in the forward mode in which the measured configuration is received as input and the forward kinematic model 607 determines a corresponding position state of the tip 103 ($U'_{tip}$, $U_{tip}$).

Embodiments of the present invention provide for a measured displacement or indentation depth $In_m$ to be determined using an indentation depth calculation module 609. In these embodiments, the indentation depth calculation module 609 first determines the tip position in the air represented as a_p_tip in FIG. 7B. The tip position in the air refers to the position of the tip 103 in air or free space given by a free-space kinematic model operating in forward mode as if it was subjected to a similar tendon length and tendon tension as the measured configuration ($C_k$, $T_m$, $L_m$). The free-space kinematic model is trained to map the cartesian/spherical position coordinates of the tip 103 in free space with respect to its base (x-y-z triad) shown in FIG. 7B to the length and tension of the selected tendons.

Figure 7B:
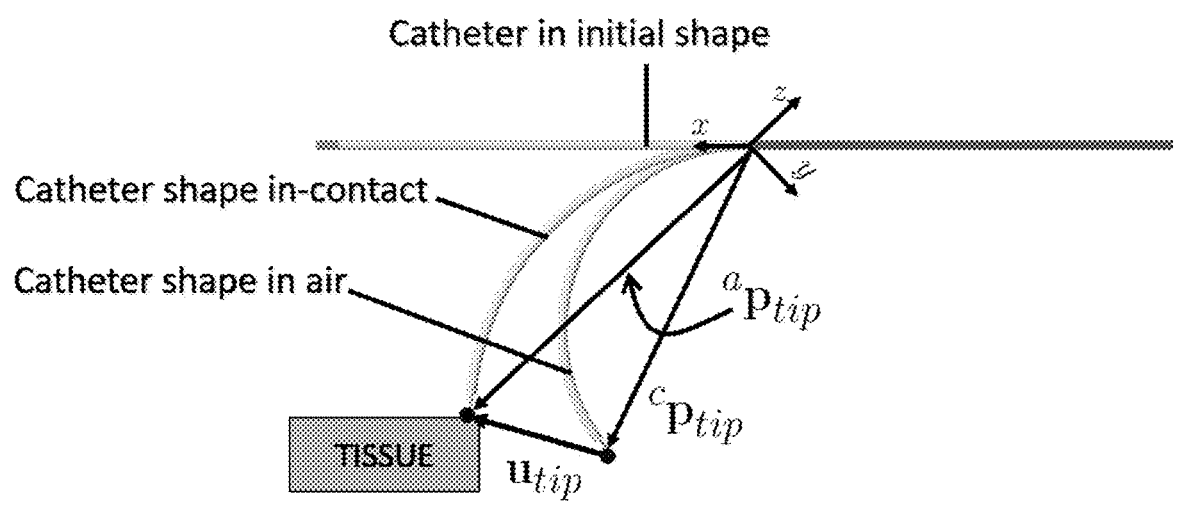
FIG. 7B schematically illustrates an indentation depth determination in accordance with an embodiment.

According to an embodiment, the indentation depth calculation module 609 calculates a distance differential between the measured tip position $U_{tip}$ and the tip position in the air a_p_tip, as shown in FIG. 7B. This differential is directly proportional to the indentation depth and can be used as a surrogate to represent the physical indentation $In_m$.

The measured indentation depth is provided as input to an inverse force-contact model 611. In one embodiment, the inverse force contact model 611 implements, in inverse mode, the catheter-tissue contact model described with reference to FIG. 4 to determine a measured force $F_m$ based on the measured indentation depth ($In_m$) of the tip 103.

In one embodiment, the feedback control loop includes a force control loop and a tendon configuration control loop. In the force control loop, the force differential $F_{err}$ between the estimated or measured force $F_m$ and the desired force Fa can be input to the forward contact model 601 and used to obtain an incremental change to the desired indentation. The force control loop attempts to have Ferr tend to zero with time. In operation, the incremental changes in the catheter-tissue indentation tend to zero when the actual force equals the desired force. Thus, at any given time, the forward force-contact model 601 determines the incremental indentation depth necessary to match the force error $F_{err}$. On the other hand, to generate the indentation, the catheter's tip position incrementally changes to generate the required indentation depth.

In one embodiment, the tendon configuration control loop uses, as input to the inverse kinematic model 603, a differential ($U'_{err}$, $U_{err}$) between the desired position state ($U'_d$, $U_d$) and the estimated position state ($U'_{tip}$, $U_{tip}$) to enforce the incremental tip position change. In operation, the tendon configuration control loop attempts to have the differential ($U'_{err}$, $U_{err}$) tends to zero (0,0) with time.

In one embodiment, the tendon configuration control loop is used after the force control loop to enforce the tendon length and tension to tend toward the values necessary to obtain the desired force.

Those skilled in the art will recognize that the force control loop and the tendon configuration control loop can be implemented as a proportional-integral-derivative (PID) controller, an impedance controller, a robust controller, a predictive controller or other model-based or non-model-based controllers.

In the following, there is described an exemplary method and system for providing force control of a catheter on a tissue using position control of the tip of the catheter.

Interaction Modeling Method

In order to estimate and control the contact force at the catheter-tissue interface, a nonlinear viscoelastic material model of tissue is proposed. Also, both forward and inverse models are formulated, and, for each, an implicit solution schema is provided. Furthermore, model parameter identification, model verification, and validation are performed for an ex-vivo porcine atrial tissue model. FIG. 6 depicts a conceptual high-level control system for maintaining tissue-catheter contact force at a desired level Fa through driving k tendon lengths, $l^1 \cdots {}^k$. Labels F, u, and l denote the contact force, tip displacement, and length of tendons, while d, m, and err stand for desired, model estimation, and error, respectively. For the force control system to perform accurately, an accurate and fast contact model is desirable. To this end, a contact model is proposed and validated as follows.

A. Contact Model

For modeling the contact with tissue, the n-unit generalized Kelvin-Voigt (n-GKV) model is adopted (see FIG. 4). As depicted in FIG. 4 this improved model incorporates a nonlinear elastic element with parameter $k_0$ and n serial linear Kelvin-Voigt units with stiffness constants $k_i$ and viscous constants $c_i$. Also, the inertial effects of the heart wall motion are neglected for the sake of simplicity. The latter assumption is in agreement with the findings that structural forces dominate the inertial forces at low-frequency heart-beat, e.g. 1-2 Hz. The elastic element was considered as a power-law spring with the force-length equation described by Eq.1. Nevertheless, each of the elements in the n-GKV can be replaced with other forms of nonlinearities, e.g., exponential, rational, Fourier series, or polynomials. Also, n-GKV represents the mechanical impedance of the interaction. Therefore, other forms of mechanical impedance can be used with the proposed method. In the following, a representative n-GKV was used for interaction modeling.

$$F = -k0(x_1 - x_0)^p, \qquad (1)$$

Similarly and due to the serialization, force balance condition for an arbitrary i-th Kelvin-Voigt unit can be formulated as:

$$F = -k_i(x_{i+1} - x_i) - ci(x'_{i+1} - x'_i) \; i = 1, 2, \ldots n, \qquad (2)$$

subjected to two homogenous Dirichlet and Neumann boundary conditions:

$$x_{n+1}(t) = 0, \qquad (3)$$

$$x'_{n+1}(t) = 0, \qquad (4)$$

and 2n initial conditions:

$$x'_i(0) = 0 \; i = 1, 2, \ldots n. \qquad (5)$$

The model is assumed at initial rest with all the springs and dash-pots at their resting lengths. Using Eq.2 for all i-s, a system of n ordinary differential equations (ODE) with n unknowns can be formed and re-arranged in the form of Eq.6.

$$Kx(t) + Cx'(t) = -f(t), \qquad (6)$$

where $K_{n \times n}$, is the stiffness matrix and, $C_{n \times n}$ is the viscous matrix, $x(t)_{n \times 1}$ and $x'(t)_{n \times 1}$ are the displacement and velocity vectors, a.k.a. state vectors, and $f(t)_{n \times 1}$ is the force vector. State vectors are defined as:

$$x(t) = [x_1(t), x_2(t), \ldots, x_n(t)]^T, \qquad (7)$$

$$x'(t) = [x'_1(t), x'_2(t), \ldots, x'_n(t)]^T, \qquad (8)$$

and force vector as follows:

$$f(t) = [F(t), F(t), \ldots, F(t)]^T, \qquad (9)$$

where $(.)^T$ denotes transpose operator. Also, the elements of stiffness and viscous matrices are obtained as:

$$K_{ij} = \begin{cases} k_i & i = j \\ -k_i & i = j - 1 \\ 0 & \text{otherwise} \end{cases} \quad i, j = 1 \ldots n, \qquad (10)$$

$$C_{ij} = \begin{cases} c_i & i = j \\ -c_i & i = j - 1 \\ 0 & \text{otherwise} \end{cases} \quad i, j = 1 \ldots n. \qquad (11)$$

B. Solution Schema

The forward model can be solved using a fourth order Runge-Kutta (RK4) method to find the $x_i$s where F(t) is known.

Consequently, $x_0$ is obtained using the following re-arranged form of Eq.1:

$$x_0(t) = x_1(t) + \left(\frac{F(t)}{k_0}\right)^{\frac{1}{p}}, \quad (12)$$

For the inverse model, the time-history of $x_0(t)$ is assumed as known. Knowledge of the displacement state (x(t), x'(t)) can be used to solve Eq.6 for f(t). To this end, the displacement state reconstruction can be performed incrementally. The incremental or explicit form of Eq.6 is obtained as follows, considering a two-term forward difference definition for x'(t):

$$x(t + \delta t) = x(t) - \delta t C^{-1}(f(t) + Kx(t)) \quad (13)$$

Since $c_i$s are non-zero and C is lower-triangular, per Eq.11, C is unconditionally non-singular; therefore, Eq.13 is unconditionally convergent. Time-step δt can be set to 0.005 sec in this part. In contrast to the forward model, in the inverse model, each increment is initiated with finding the contact force in Eq.1. Substituting $x_0(t)$ from the input and $x_1(t)$ from the last increment solution revealed F(t) in each iteration. F(t) can be further used to predict the displacements in the next time instance.

C. Parameter Identification and Model Verification

The proposed n-GKV contact model incorporated a total of 2(n+1) parameters, i.e. 2n for $k_i$s and $c_i$s, and two additional parameters of p, and $k_0$. To reduce the search space for finding the optimized model parameters, the following constraints were imposed. Power-law parameter p was constrained to be larger than 1, to meet the nonlinearity assumption. Also, p was assumed as an odd number so that Eq.1 becomes sign-preserving and compliant to the preservation of energy principle. In order to select a sufficient n and obtain optimized parameter values, a parameter optimization was performed on the results of the ex-vivo indentation test. Eq.14 describes the goal function as the difference between the model estimated work and the calculated work from the experiment. The goal function was minimized using a particle-swarm optimization (PSO) algorithm. Since PSO is a global optimization method, the resulting parameters were deemed as the global optimums.

$$\min_{n,p,k_0,k_i,c_i} \left\| \int_0^{t_1} F(t) dx_0(t) - \int_0^{t_1} \hat{F}(t) d\hat{x}_0(t) \right\|^2. \quad (14)$$

subjected to Table I

Model verification was performed by calculating the maximum absolute error $E_{max}$ and root-mean-square (RMS) error of force $E_{rms}$ between the experimental and estimated force of the optimized model.

TABLE I

SEARCH-SPACE FOR THE MODEL PARAMETERS USED FOR THE OPTIMIZATION.

| Parameter | Search-space |
|---|---|
| n [26] | 1, 3, 5, 7 |
| p | 3, 5, 7, 9 |
| $k_0$ | $\mathbb{R}+$ |
| $k_i$ | $\mathbb{R}+$ |
| $c_i$ | $\mathbb{R}+$ |

D. Model Validation

To validate the optimized model, a dynamic triangular test with a similar range to the sinusoidal test and a frequency of 1.25 Hz (75 bpm) was performed on another spot with 5 mm distance to the original spot. Similar to the verification test, $E_{max}$ and $E_{rms}$ were used to assess the model performance.

Results and Discussion

Figure 8:
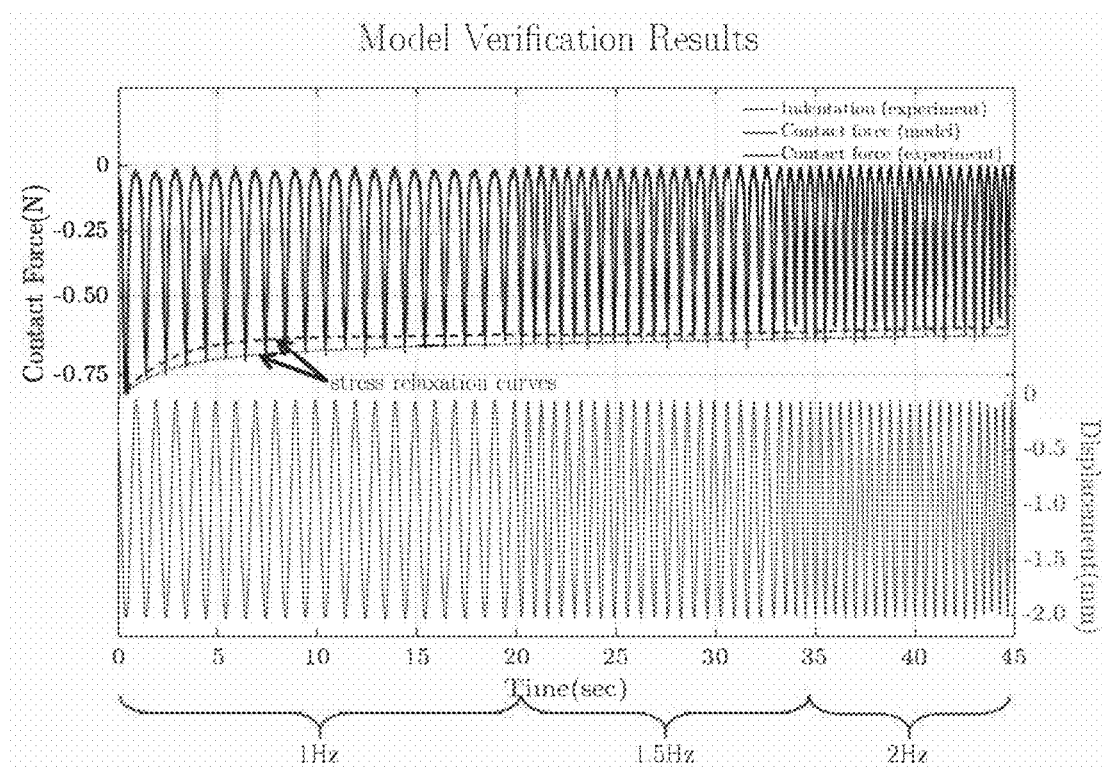
FIG. 8 illustrates a comparison of the contact force and displacement during ex-vivo experiment, in accordance with an embodiment.

To find the optimized model parameters for a valid contact model, a dynamic indentation test on a freshly excised porcine atrial tissue can be performed. FIG. 8 shows the displacement of probe-tip $\hat{x}_0$, during the ex-vivo test. Also, it depicts a comparison of the measured contact force $\hat{F}$ and model-estimated contact force F. The optimization process was performed on a computer equipment, equipped with a 3.3 GHz CPU and 32 GB of RAM. Also, with the use of 200 parallel threads, the optimization time decreased significantly. Total computation time for finding the optimized model was 850 msec and for estimating the contact force using the optimized model was 5 msec. Considering the fact that finding the optimized model is needed only once for a specific ablation spot, results suggest that the proposed model and solution schema are fast-enough for RFA procedures. Table II summarizes the computation time breakdown.

TABLE II

BREAK-DOWN OF THE COMPUTATION TIME.

| Procedure | Computation-time (msec) |
|---|---|
| Model optimization | 850 |
| Displacement acquisition (per time-increment) | 5 |
| Force estimation (per time-increment) | 5 |

Figure 9:
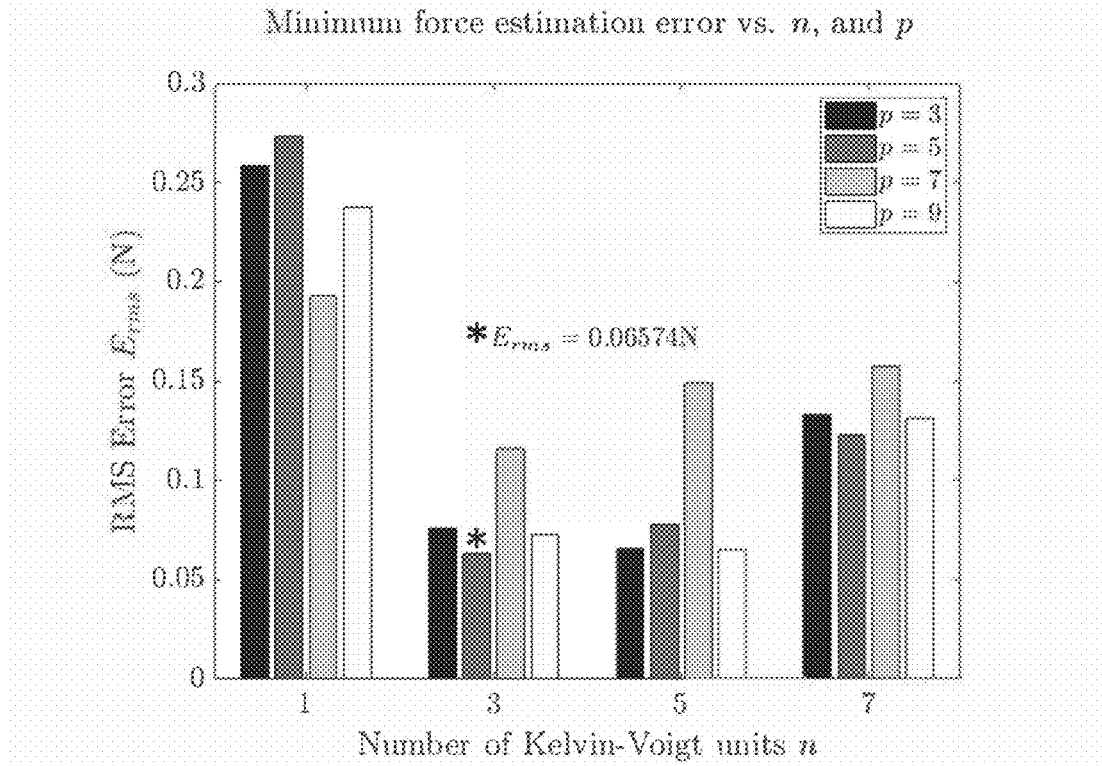
FIG. 9 illustrates changes in the optimization landscape for Erms with respect to the number of Kelvin-Voigts units in accordance with an embodiment.

Contact force F was estimated using the optimized contact model. As FIG. 9 depicts, PSO minimization indicated the best force estimation was obtained with n=3 and p=5. RMS-error of force-estimation with this model was $E_{rms}$=0.06574N and maximum absolute error $E_{max}$=0.09144N. As FIG. 9 indicates, RMS-error decreased by increasing the number of K-V units from 1 to 3, however models performed worse by further employing K-V units, i.e. n=7, 9. Such a trend has previously been reported and is known as associated with the over-fitting and error accumulation.

As for the power-law parameter p, not a specific trend of change in the error was observed. In the process of finding the best performing model, the same order of RMS-error was observed with (n=3, p=5), (n=5, p=3), and (n=5, p=9). However, considering the fact that larger n would result in a larger and more complicated model, the 3-GKV model with p=5, i.e. (n=3, p=5) was selected as the optimal model. Table III summarizes the optimum parameters associated with the optimal contact model.

TABLE III

OPTIMIZED MODEL PARAMETERS FOR 3-GKV.

| n = 3 p = 5 | $k_0\left(\frac{N}{mm}\right)$ | |
|---|---|---|
| | 0.2212 | |
| $k_1\left(\frac{N}{mm}\right)$ | $k_2\left(\frac{N}{mm}\right)$ | $k_3\left(\frac{N}{mm}\right)$ |
| 0.5476 | 0.4713 | 0.7032 |
| $c_1\left(\frac{N}{mm\cdot sec}\right)$ | $c_2\left(\frac{N}{mm\cdot sec}\right)$ | $c_3\left(\frac{N}{mm\cdot sec}\right)$ |
| 15.9645 | 9.5157 | 1.7820 |

Figure 10A:
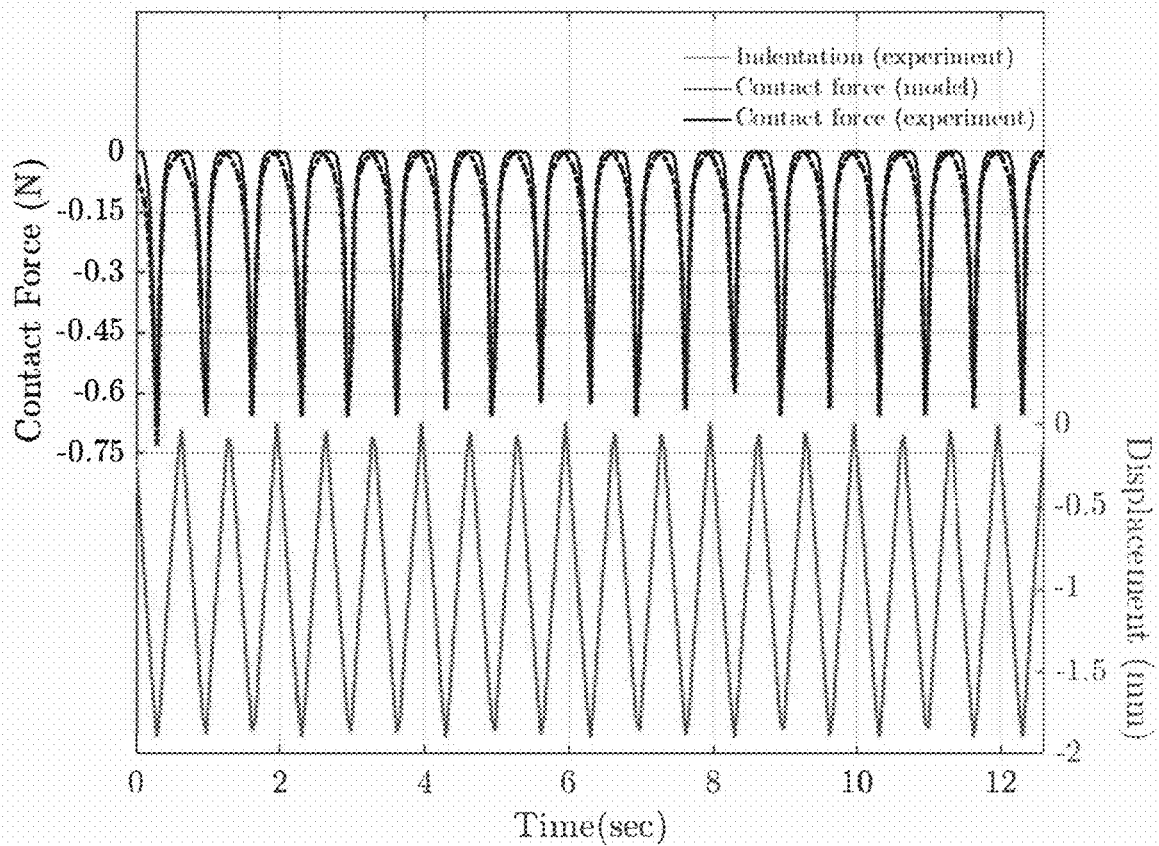
FIG. 10a illustrates results of contact force estimation in accordance with an embodiment.
Figure 10B:
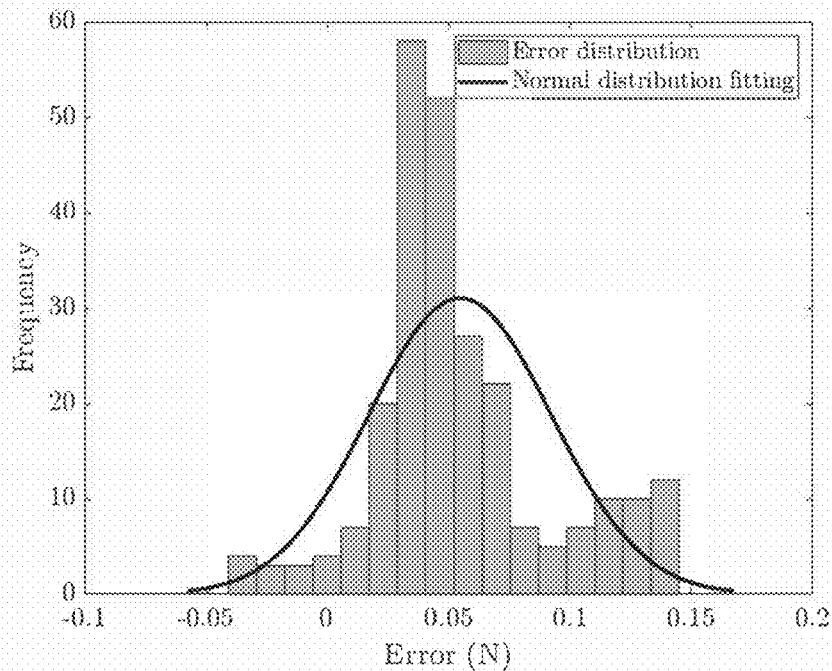
FIG. 10b illustrates a distribution of errors between experiment and model validation in accordance with an embodiment.

In addition, FIG. 10a depicts the results of the validation test with triangular indentation test. Similar to the verification test, results of the optimal model are in fair agreement with experiment. Maximum absolute error $E_{max}$ was 0.1141N and RMS-error $E_{rms}$ was 0.0544N. Further error analysis revealed that the average absolute error was 0.0520±0.0662. It also showed that error F-F^ has a normal distribution around its average. Also, from the fact that the average error is positive, it is inferred that the proposed model overestimated the contact force by a maximum percentage of nearly 15%. However, further investigation revealed that the maximum overestimation occurred at near-zero displacements. The model predicted the maximum contact force with an acceptable error ($E_{rms}$<5%). FIG. 10b depicts the distributions of error and its associated normal fit.

Summary

In this part, initially a control system for displacement-based force control of the steerable RFA catheters was conceptualized. The proposed system necessitated utilization of a valid and accurate yet fairly fast and simple contact model for the catheter-tissue contact model. to this end, an n-generalized Kelvin-Voigt viscoelastic model was proposed. The proposed model was formulated for both direct and inverse model solution modalities and the model parameters were optimized using the particle-swarm optimization (PSO) technique.

Both verification and validation studies revealed low computational surplus for the proposed solution schema. Furthermore, model estimations were in fair agreement with experiments. Therefore, the provided contact model and its associated solution schema are reliable-enough for utilization in the proposed force control system.

In addition, utilization of the energy goal-function guaranteed that the energetic behavior of the model replicates that of the tested tissue. Since stress-relaxation is an energy drift mechanism, one would suggest the agreement of model stress relaxation with the experiment as a supporting evidence.

Position Control
A. Novelty and Innovation

With the current RCI technology, maintaining the tip of the catheter in constant contact with the atrial wall is a surgical task that needs repeated correction of the tip position by the surgeon through the master module of the RCI. This has been reported to be cumbersome and increasing the cognitive load of the surgeon. Therefore, an RCI system with level-2 autonomy (task autonomy) capable of autonomous tip position control of the catheter for establishing and maintaining contact with the atrial wall is favorable.

With the task autonomy, the surgeon would determine the position of the catheter tip (for example from a previously 3D map of the heart) and the robot would control the shape of catheter to reach the target position. Also, the surgeon would be monitoring the maneuver of the robot and interfere if the need would be. In the present part, an inverse kinematics-based schema for the position control of the tip of a tendon driven catheter is provided. The catheter is custom-designed and fabricated with a four-tendon actuation mechanism. The provided schema is based on a nonlinear learning-based (artificial neural network) inverse kinematics. Such a learning-based approach allows for implementing the control schema with low computational surplus, which is a well-known limitation of the mechanistic models, e.g. continuum mechanics-based models. Also, it allows for intrinsic compensation of internal friction and backlash, as the learning-based model can be trained by the actuation data from the catheter prior to the task performance. In practice, since the catheters are single use, such a model training (a.k.a calibration) can be automatized as a part of the system setup.

Another challenge is to resolve the redundancy of the catheter actuation. The catheter tip had two degrees-of-freedom (DoF) in the task-space while it had four actuation DoFs (one DoF for each tendon). Such a configuration made the catheter over-actuated and actuation redundant. Utilizing a learning-based classifier, and by limiting the number of tendons to be simultaneously driven to only two, the redundancy was resolved and the catheter model was incrementally treated as a fully-actuated system.

Based on the results, the learning-based kinematic model and feed-forward position control can provide a low-maintenance, fast, and accurate alternative to the currently available model-based and sensor-based control schema.

Position Control Methods

In this section, an overview of the catheter fabrication and the RCI mechanism used in this part is provided. Afterward, the theoretical workspace of the catheter based on the constant bending radius assumption is obtained and its validity is investigated by experimental comparison. Furthermore, the proposed learning-based forward and inverse kinematic model of the catheter is described and the accuracy of those are investigated. In the end, the experimental tests procedures and setups for studying the performance of the proposed trajectory tracking are described.

A. Catheter Fabrication and Assembly

The prototyped catheter in this part, named as MiFlex, is a tendon driven catheter with four inextensible tendons. The selected dimensions for the catheter prototype was 6 mm in diameter and 40 mm in length. The selected diameter was to replicate an 18-Fr (1 Fr=⅓ mm) catheter and the length was 40 mm for the average transversal diameter of the right atrium in adults diagnosed with AFib.

For the fabrication, a cylindrical mold was rapid prototyped with a 3D printer (Replicator+, MakerBot, NY, USA). Also, a square platform (16×16×8 mm), housing four through holes, was 3D-printed to provide a platform for the fixed end of the catheter. The through holes were used to accommodate anchorage M2 screws for fixing the mold to the platform and later were used as guides for the four tendons. The number of tendons affects the feasible workspace of the catheter and can be 2 or more. Also, the number of tendon actuation classes is determined by the number of tendons in the design. Typically, 1 to 6 tendons can be used for the catheter but it may be more depending on the need.

The catheter comprises a steel compression coil spring with a nominal outer diameter of 5 mm and a compressive stiffness of 0.35 N/mm. The spring is installed at the center of the cylindrical mold while silicon rubber material for the body of the catheter is filled in the mold. The use of coil spring can enhance the ability of the catheter to recover to its original shape by compensating for the viscous energy damping in the rubber material. The coil spring can be replaced with other elastic structures such as metal (or carbon-reinforced) braided tubes. After filling the mold, it was rested still in a vacuum chamber under 29 mmHg vacuum pressure for discarding the air bubbles (degassing). Furthermore, the degassed mold was rested for 24 hours at 24° C. for final curing. After curing, the platform was secured in a 3D-printed base. The reason for the base was to make the assembly modular and facilitate the replacement of the catheter and base. In practical cases, the catheter would be a single-patient use disposable thus such a modular design can help in replacing the catheter.

B. RCI System Overview

At the system level, the RCI system in this part is designed with three modules, i.e., mechanical, electrical, and software modules. Four independent stepper motors, identified as $M_{1-4}$, are used to control the length and tension of the tendons, i.e., $L_{1-4}$ and $T_{1-4}$. The motors can be controlled using two independent stepper motor drivers stacked on two ATMEGA microprocessor (Uno, Arduino Co., MA, USA). Each microprocessor can also be connected to two potentiometers (as rotary encoders) to measure the angle of the shaft of the motors.

The software architecture is used for the feedback control of the motors, trajectory error estimation, and data storage. The software is composed of two components: the user interface (UI), running on the computer equipment, and the firmware (FW) loaded on the microprocessors. The UI can be used to acquire the user inputs, i.e., the desired trajectory and the target within the workspace. The FW can be used to receive the desired tendon lengths and tensions from UI and relaying the current tendon lengths and tensions back to UI. The control framework can be implemented in the FW (low-level implementation) and the trajectory generation and task-space to joint-space mapping (inverse kinematic) can be implemented in the UI (high-level implementation).

Also, for validation purposes, the trajectory of the tip marker is tracked in realtime using two USB cameras having an 800×600 pixels resolution, with a stereo-calibration. The stereo-vision verification on a chess-board template showed an error of ±0.26 mm in detecting the corners of the squares in the template. It is noteworthy that the position feedback from the camera tracking served merely as a reference.

C. Control Framework

Figure 11:
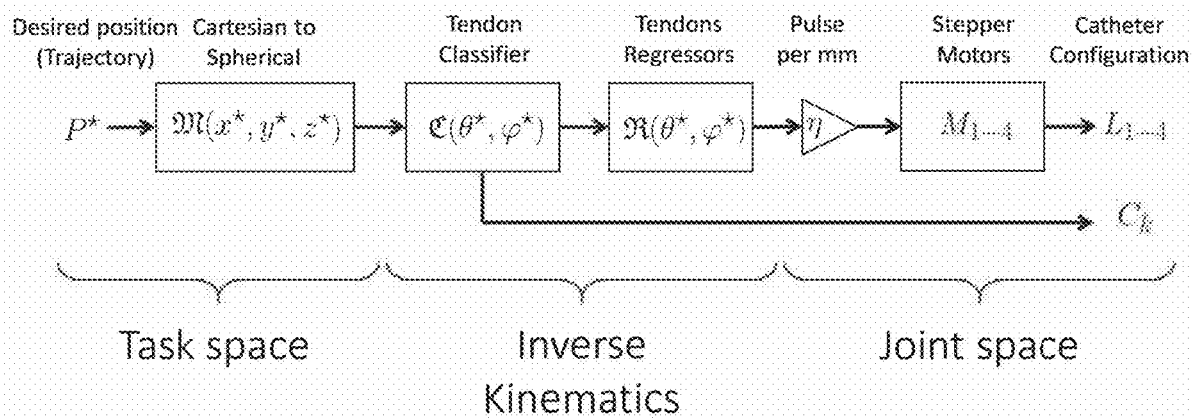
FIG. 11 schematically illustrates learning-based feed-forward control system for position control of the tip of the catheter in accordance with an embodiment.

In order to enable the RCI system to exhibit task autonomy for trajectory following tasks, the presented control system in FIG. 11 is proposed. The control goal is to attain and hold a given desired position, P* in the task-space (global Cartesian) through changing the length and tension of tendons.

The kinematics of the catheter can be done in spherical coordinates thus a mapping M: R3→R2 from Cartesian to spherical coordinates is used. Afterward, the control system can determine the desired length and tension of a set of tendons (control state) by which the tip of the catheter would reach P*.

The proposed control framework is a feed-forward system. The utilization of an internal motor shaft position feedback in the motor drivers $M_{1-4}$ ensures that the desired tendons lengths are attained. For such a control framework, a mapping between the desired kinematic state in task-space ($\theta^*$, $\phi^*$) and the joint-space variables $L^*_{1-4}$ is performed. Such a mapping constitutes an inverse kinematic problem. Mechanistic modeling of the problem involves nonlinearities such as material nonlinearity, internal friction between the tendons and the body of the catheter, and tendon slacking. As an alternative to the mechanistic approach, the inverse kinematic problem is divided into learning-based classification and regression problems. For a given desired position P*, the classifier, i.e., $C(\theta^*, \phi^*)$ can determine tendon(s) to be pulled, while the regressor would determine length and tension of the said tendon(s) (desired lengths and desired tensions). The objective of the inverse kinematics is to determine the catheter configuration, i.e. ($C_k$: i-j, $L_i$, $L_j$; $T_i$, $T_j$) in joint space, for a given desired position P* in the task space.

D. Inverse Kinematics

1) Degrees of freedom: Due to the relatively larger longitudinal stiffness compared to the bending stiffness, the compression of the catheter along its spine can be neglected. Therefore, $$|\vec{OP}| = 2r\theta = 40 \text{ mm constant.} \tag{15}$$

Also, $\vec{P}:=\vec{OP}$ was presented in the global Cartesian coordinates and spherical coordinates as $$\vec{P} = (x \quad y \quad z)^T \in S^+, \tag{16}$$

and $$\vec{P} = (\rho \quad \theta \quad \varphi)^T \in S^\circ, \tag{17}$$

where, $S^+ \in R^3$ and $S^\circ \in R^3$ are the Cartesian and spherical representation of the working space (surface) of the catheter, and $\rho \in R$, $\theta \in [0, \pi]$, and $\phi \in (-\pi, \pi]$. The mapping from the Cartesian coordinates to the spherical and its versa are obtained as:

$$\begin{pmatrix} \rho \\ \theta \\ \varphi \end{pmatrix} = \begin{pmatrix} \sqrt{x^2 + y^2 + z^2} \\ \arccos\left(\frac{z}{\sqrt{x^2 + y^2 + z^2}}\right) \\ \arctan2(y, x) \end{pmatrix}, \tag{18}$$

$$\begin{pmatrix} x \\ y \\ z \end{pmatrix} = \begin{pmatrix} \rho\sin\theta\cos\varphi \\ \rho\sin\theta\sin\varphi \\ \rho\cos\theta \end{pmatrix}, \tag{19}$$

where, arctan 2(y,x) is the two-parameter non-singular tangent inverse function defined as $$\arctan2(y, x) = \begin{cases} 2\arctan\left(\dfrac{y}{\sqrt{x^2+y^2}+x}\right) & x > 0 \\ 2\arctan\left(\dfrac{\sqrt{x^2+y^2}-x}{y}\right) & x \le 0, y \ne 0 \\ \pi & x < 0, y = 0 \end{cases} \quad (20)$$

$$\rho = 2r\sin\theta. \quad (21)$$

Substituting r from Eq. 15 in Eq. 21, yields the following kinematic constraint between $\rho$ and $\theta$:

$$\rho \frac{\theta}{\sin\theta} = 40 \text{ mm constant.} \quad (22)$$

In fact, Eq. 22 describes the locus of the theoretical workspace of the tip of catheter in terms of the spherical coordinates $\rho$ and $\theta$. Moreover, it shows that the workspace is independent of $\phi$. Given that Ob coincides on the z=0 plane, the workspace would necessarily be axisymmetric with respect to Z-axis.

Figure 12A:
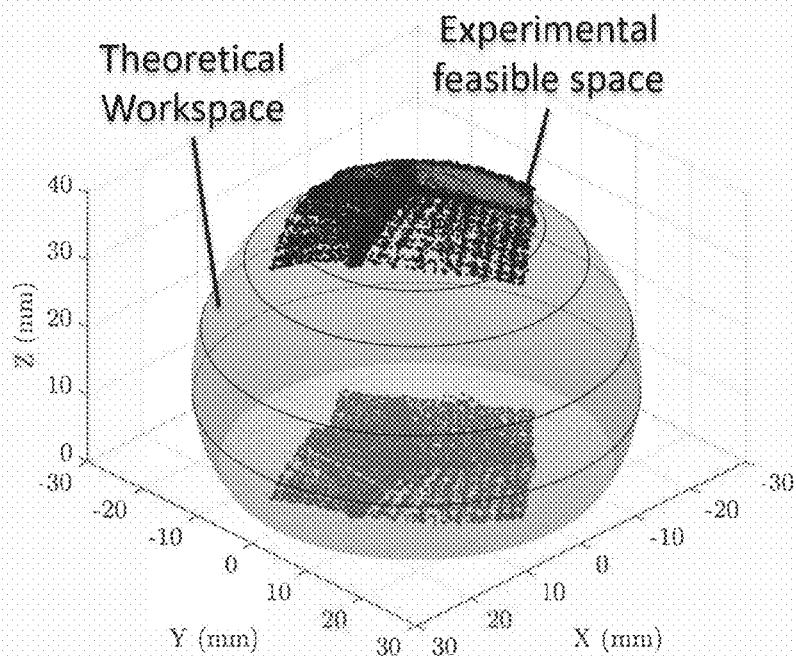
FIG. 12a illustrates a comparison of the theoretical workspace and the feasible workspace of the catheter in accordance with an embodiment.

FIG. 12a depicts the theoretical workspace of the catheter at various $\theta_s$. Another deduction of Eq. 22 is that the minimum number of independent coordinates to fully describe the catheter tip position were ($\rho$, $\phi$) or ($\theta$, $\phi$). Therefore, the catheter had two degrees of freedom. FIG. 12a depicts the feasible workspace of the catheter overlaid on the theoretical workspace. The feasible workspace of the catheter is obtained by sequentially pulling the tendons in all the possible dual tendon classifications, labeled as tendon classes C1: 1-2, C2: 2-3, C3: 3-4, C4: 4-1, C5: 2-4, C6: 3-1. To obtain a complete feasible space, for each Ck: i-j, tendon i would increment for 1 mm (up to 10 mm) while tendon j would complete a 10 mm sweep. Meanwhile, the position of the tip of the catheter was tracked using the stereo cameras.

2) Tendon selection: classification: It was observed that for a given point in the feasible space, the tendon configuration might not be unique. In other words, for some points in the feasible region, multiple combinations of tendons and lengths would lead the tip of the catheter to a similar position. Such circumstances define a redundant control space that can be resolved. The redundancy can be resolved by selecting the tendon classes $C_{1-4}$. The selection is performed based on the obtained subspaces for Cks (FIG. 13a), such that the least overlap is observed.

Figure 13A:
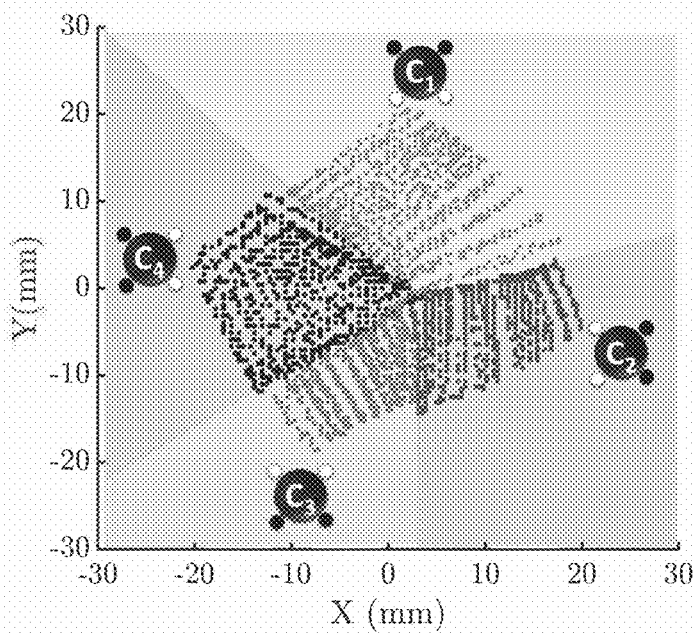
FIG. 13a illustrates a contour of the classified feasible space on XY-plane in accordance with an embodiment.
Figure 13B:
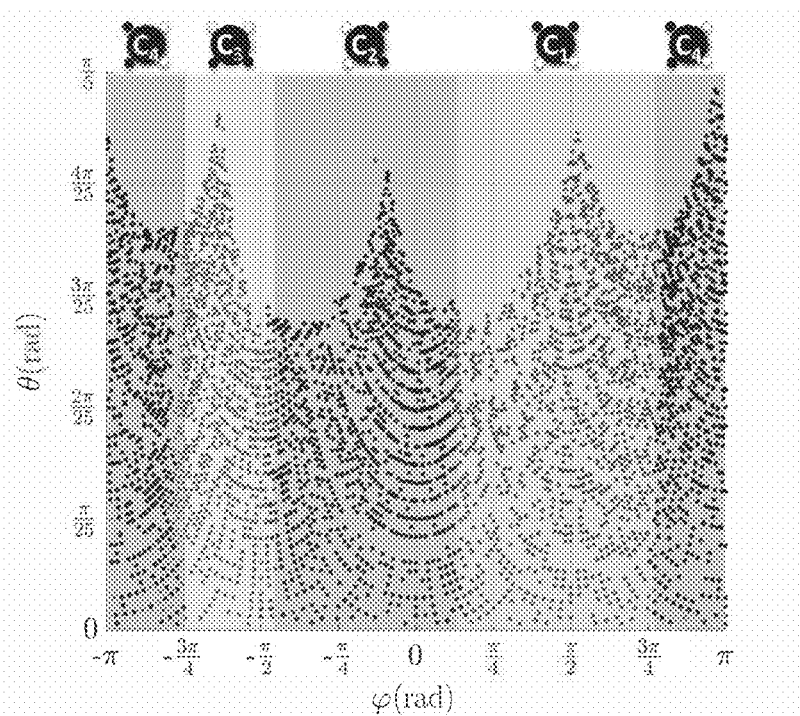
FIG. 13b illustrates a feature space constructed by θ and φ in accordance with an embodiment.
Figure 13C:
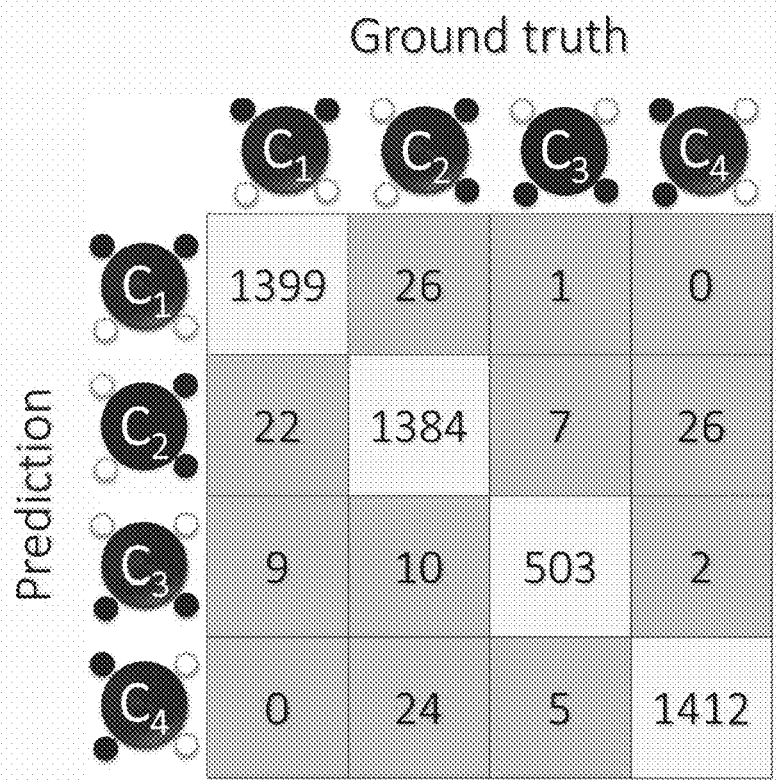
FIG. 13c illustrates a confusion matrix for tendon class prediction resulting from the validation data in accordance with an embodiment.
Figure 14A:
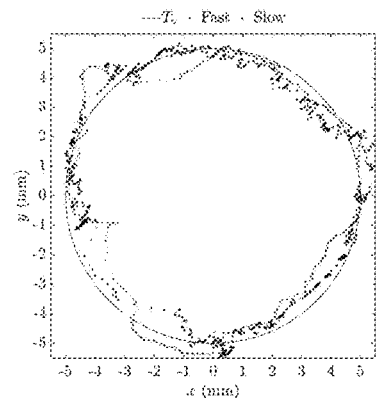
FIGS. 14a, 14b, 14c, 14d illustrate desired and experimental trajectories for circular, spiral, triangular, and infinity-shape trajectories in accordance with an embodiment.
Figure 14B:
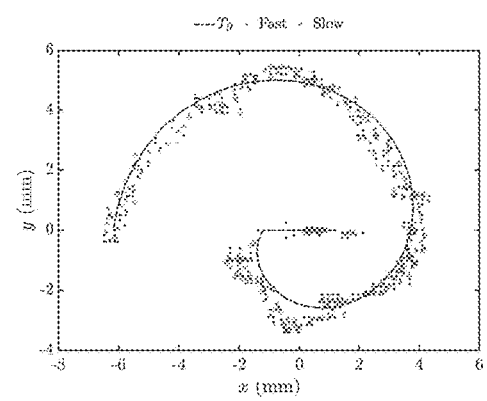
Figure 14C:
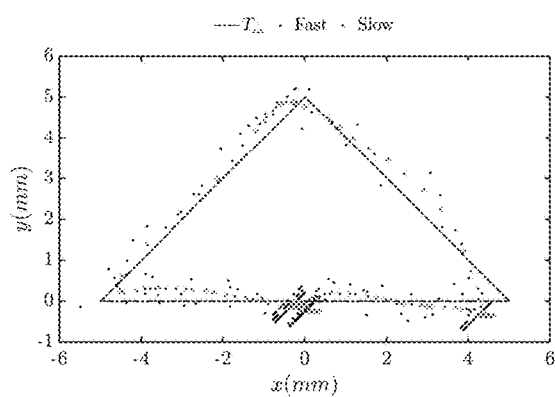
Figure 14D:
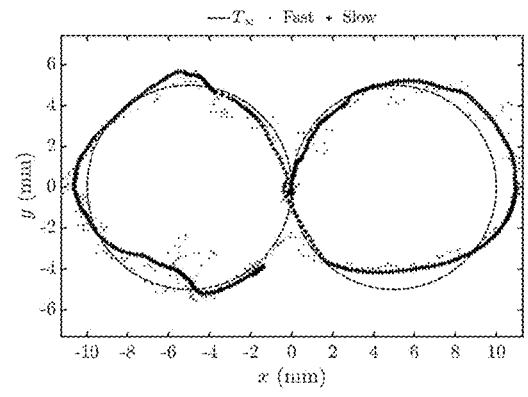

Afterward, a support vector machine (SVM) classifier with a linear kernel is trained with $\theta$ and $\varphi$ as the features and $C_{(1-4)}$ as the categories. SVM classifier can be replaced with any other classification method such as artificial neural networks (ANN), logistic regression classification (LRC), decision tree (DT), or ensemble methods (such as random forests). The dataset of the feasible space, containing the spherical coordinates of the feasible space (n=16100), was divided into training and validation data with a 70:30 ratio. The model training and validation was performed using Matlab Classification Toolbox (Matlab R2019b, Mathworks, MA, USA). FIGS. 13a, 13b and 13c depict the contour of the classified subspaces on XY-plane, the features space of the training data, and the confusion matrix of the SVM classification. Adopting the accuracy metric defined as $$\text{accuracy} = \left(1 - \frac{\sum \text{off-diagonal components}}{\sum \text{all components}}\right) \times 100, \quad (23)$$

the accuracy of the classifier for tendon class prediction was estimated as 97.3%.

3) Tendon length estimation: regression: In the control framework, the next step was to determine the desired length of each tendon through neural network regression. Neural network can be replaced with other regression methods such as linear, polynomial, power-law, Fourier series, stepwise regression, Weibull model, ridge regression, lasso regression, ElasticNet or support vector regression. To this end, four individual neural networks, denoted as $NN_k$, (k=1 . . . 4), were trained with the classified $(\theta, \phi)^T$ as input and $(Li, Lj)^T$ as output for the four tendon classes, i.e., Ck: i-j. In addition to the input and output layers, each $NN_k$ network had ten hidden layers (with five neurons each) with fully connected architecture. The training was performed using the damped least-square method, a.k.a. Marquard-Levenberg algorithm. Similar to the classification, the dataset was divided with 70:30 ratio for training and validation, respectively. Table IV summarizes the adjusted goodness-of-fit (adj-$R^2$) and error of prediction for each $NN_k$.

TABLE IV

GOODNESS-OF-FIT (ADJ-$R^2$) AND AVERAGE PERCENTAGE OF PREDICTION ERROR ($E_\%$) FOR THE NEURAL NETWORKS $NN_{1-4}$.

| | adj-$R^2$ | | $E_\%$ | |
|---|---|---|---|---|
| $C_k$ : t – j | $L_i$ | $L_j$ | $L_i$ (mean ± SD) | $L_j$ (mean ± SD) |
| $NN_1$ : 1 – 2 | 0.97 | 0.97 | 3.1 ± 0.5 | 3.5 ± 0.4 |
| $NN_2$ : 2 – 3 | 0.99 | 0.94 | 2.8 ± 0.4 | 4.2 ± 0.3 |
| $NN_3$ : 3 – 4 | 0.94 | 0.98 | 4.4 ± 0.6 | 4.7 ± 0.6 |
| $NN_4$ : 4 – 1 | 0.97 | 0.98 | 3.6 ± 0.2 | 4.3 ± 0.3 |

4) Control loop implementation: A robotic system with level-2 autonomy should keep the surgeon in the control loop for supervisory privileges, i.e., task initiation and termination, and trajectory selection. To meet this requirement, the control framework described above is implemented in the user interface (UI) software using object-oriented and multi-thread programming techniques. In order to increase the computational efficiency of the control loop, the SVM classifier C($\varphi^*$, $\phi^*$), four neural networks $NN_{1-4}$, and trajectory update loop were implemented in parallel. Thanks to the parallelization, the control loop in UI exhibited an average refresh-rate of 164±12 Hz. Also, at the microprocessor level, the refresh-rate of the tendon length control loop was set to 1 kHz.

Experimental Validation

Figure 12B:
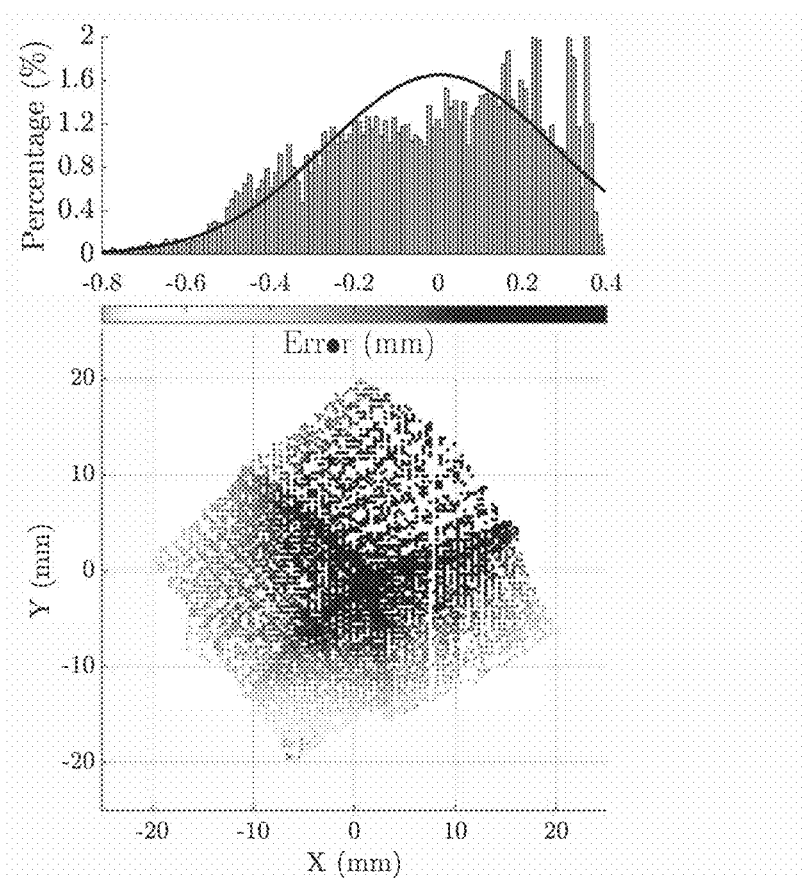
FIG. 12b illustrates a distribution of the minimum distance between the experimental tip positions and the theoretical workspace in accordance with an embodiment.

1) Experiment I: trajectory tracking: To study the performance of the proposed position control framework, the system was tested in tracking four desired trajectories. The trajectories were of circular, triangular, infinity sign, and spiral shapes and were denoted by T°, TΔ, T∞, TӘ, respectively. Also, two time periods of 5 s and 10 s per repetition were set to simulate slow and fast tasks, respectively. Each trajectory was repeated ten times at each speed. The trajectories were defined in preprocessing with fifty intermediary points in the Cartesian task-space such that the XY-projection of the intermediary points would be within the XY-projection of the feasible workspace (FIG. 12b).

Each trajectory was tested in an individual test session such that the test sessions would include ten repetitions of the slow tasks followed by ten repetitions of the fast tasks. During the tests, the UI would update the desired position P* on-line according to the temporal sequence of the intermediary points in each trajectory and the control loop would solve the inverse kinematics for each of the intermediary points in real-time. As a reference for comparison, the position of tip of the catheter was tracked with the stereo cameras during the tests.

Figure 15:
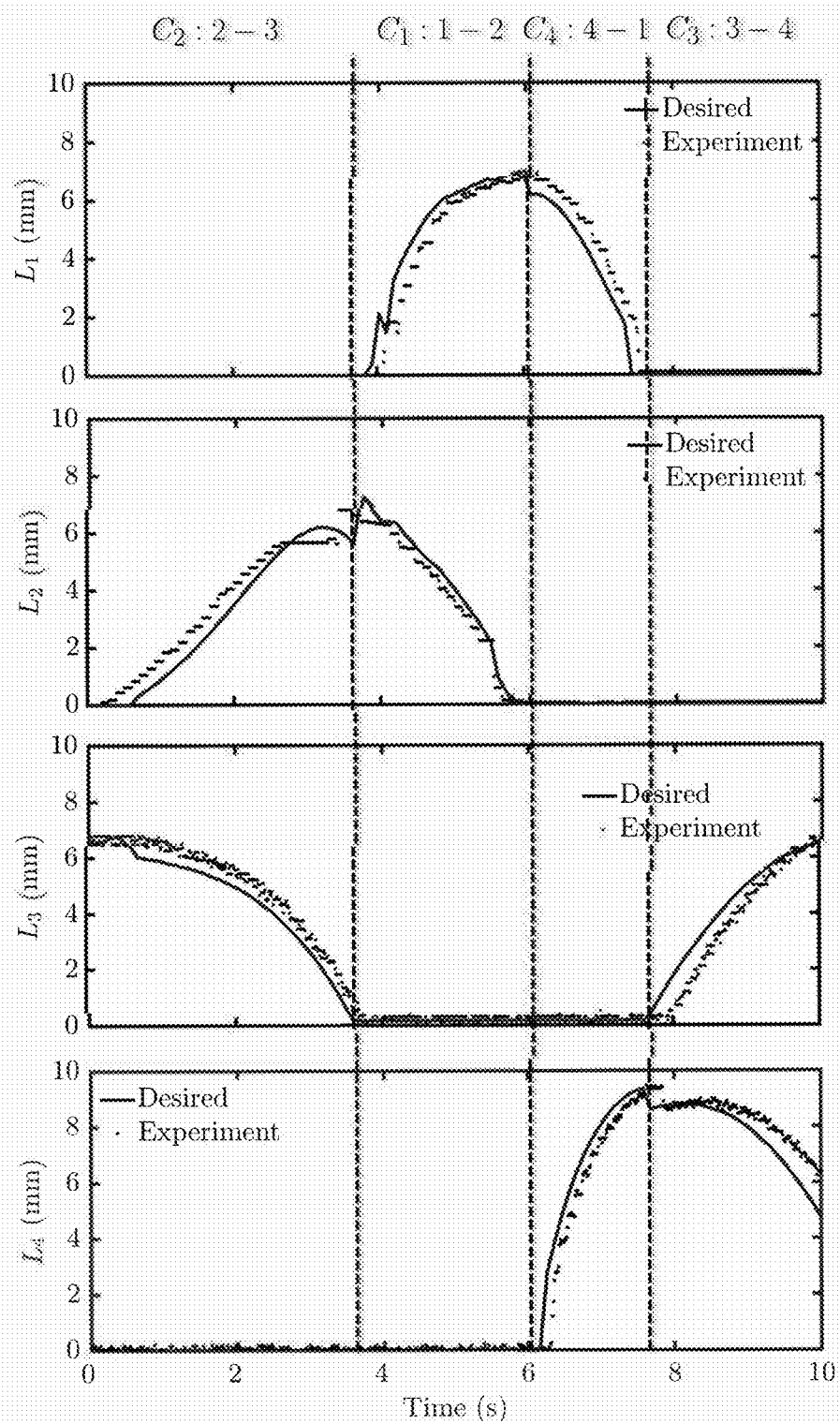
FIG. 15 illustrates desired and attained change in the length of the tendons in accordance with an embodiment.

FIGS. 14a, 14b, 14c and 14d depict the desired and experimental trajectories for circular, spiral, triangular, and infinity-shape trajectories demonstrated by the proposed RCI system and Table V presents the performance of the control system in terms of root-mean-square (RMS)-error (average of five repetitions), error range, and time-lag in the fast and slow tasks for the four trajectories. Also, FIG. 15 depicts the change of the length of tendons $L_{1-4}$ for one repetition of T° task with slow speed.

The results showed that the system was fairly accurate in following the desired trajectories as the average RMS-error for the four trajectories was 0.49±0.32 and 0.62±0.36 mm for the slow and fast speeds, respectively. Also, the time-lag between the input and output was consistent among the trajectories with an average of 0.4 s for all trajectories. A limiting factor in estimating the time-lags was the frame-rate of the cameras, i.e., 33±5 Hz, as the image frame timestamps were used as the synchronization benchmark. Therefore, the computed time-lag might have been smaller than the reported values. Another finding in this experiment was that the system was more accurate at slow speeds than fast speed trajectories. However, for both the speeds the accuracy was within the acceptable practical precision of ±1 mm. Moreover, small spikes in the temporal variation of the tip position of the catheter, e.g. FIG. 15 at t=4 s and t=8 s, were due to the change of tendon classes. At these time instances, the controller switched the classes thus, the tendon lengths before and after these instances was estimated by different neural networks. Nevertheless, the spikes are relatively small and decreased with the trajectory progressing farther from the tendon class boundaries.

2) Experiment 2: target reaching: The second experiment was performed on a freshly excised bovine myocardial tissue. Four arbitrary target points denoted as $P_{1-4}$ were selected and marked manually. Afterward, each point was selected on the top- and side-view live images in the user interface software and registered as a target. The test procedure was that after selecting each specific point the UI would determine if the point is within the catheter's reach and if so it would plan a direct path. Upon the user's approval, the system would initiate the task to hit the point, i.e., P1-4, maintain the target position for three seconds, return to its resting position, i.e., $P°=(0, 0, 40)^T$, and repeat the task for four repetitions.

This experiment was to replicate a robot-assisted ablation intervention with level-2 autonomy, where the surgeon would only specify the pre-planned location of the target point(s) on intraoperative images for ablation, based on which the robot would reach to the position, hold the position for the period on ablation (typically less than 30 s) and move to a resting position.

Figure 16:
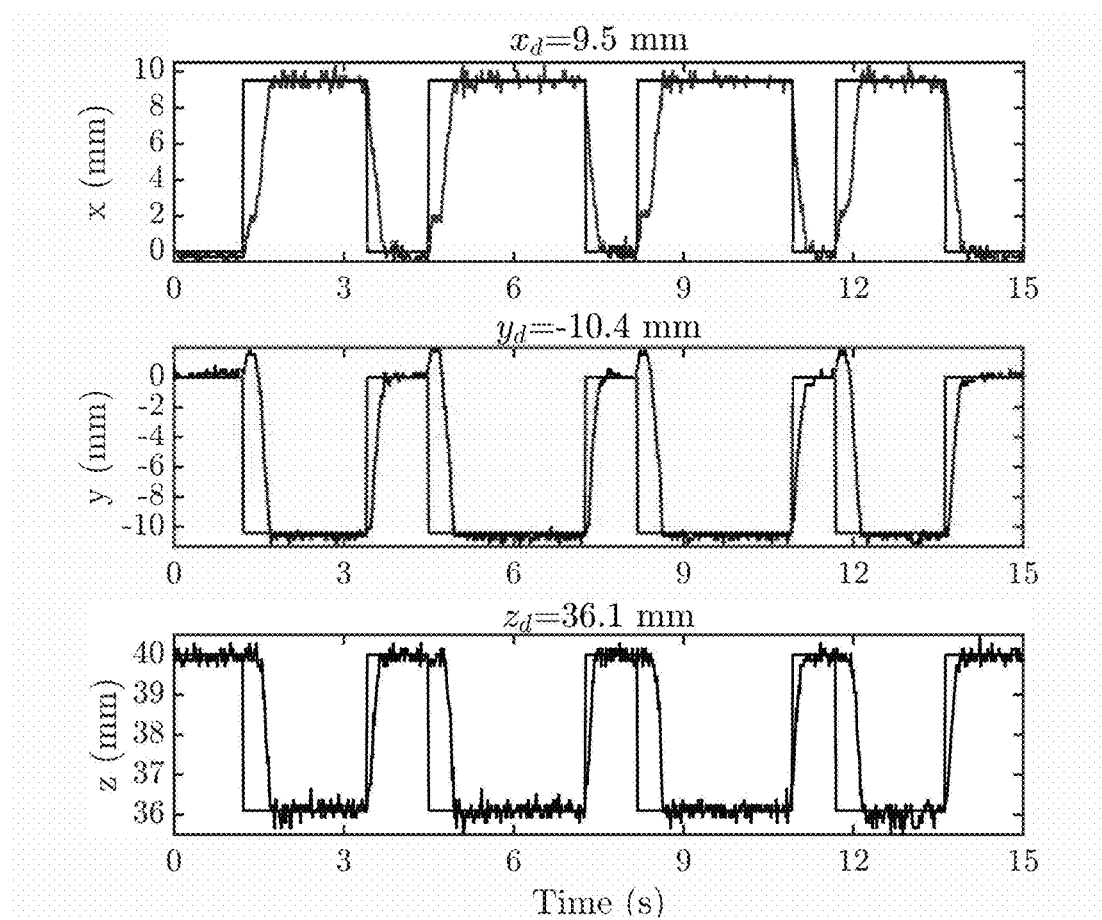
FIG. 16 illustrates Cartesian tip position of the catheter in four repetitions to reach P3 in accordance with an embodiment.

FIG. 16 shows the variation of tip position of the catheter in Cartesian task space for a representative point P3 and Table VI summarizes the position of $P_{1-4}$, temporal average maintained positions in repetitions, RMS-error of in reaching tasks, and the repeatability of reached positions (standard deviation of the accumulative average reached positions for all repetitions). The results of experiment II showed that the RCI system was successful in autonomous reaching to the pre-planned targets with a spatial error of 0.75 mm, i.e., the norm of the average RMS-error for $P_{1-3}$. Also, the system was capable of ignoring P4 as being out of the feasible zone of the catheter. Moreover, the system showed fairly repeatable target hits with a spatial repeatability of ±0.52 mm, i.e., the norm of repeatability of x, y, and z.

Summary

The goal of this part was to provide a control framework with level-2 autonomy (task autonomy) for kinematic control of flexible ablation catheters. Through learning-based classification and regression, the inverse kinematics of the soft catheter can be captured within the practical precision, i.e., ±1 mm. Also, with a one-time preoperative calibration (training), the material and geometric nonlinearities involved in the deformation of the catheter, e.g., friction, large deformation, can be captured and compensated. Thus, simplifying the catheter model. All the modules of the RCI system in this part allow for maximal software-hardware integration. The validation study for the trajectory tracking and target reaching also showed fair accuracy and repeatability for position control of the catheter.

The control system did not exhibit a dead-zone at the proximity of the resting position. Such a dead-zone has been reported in other studies, and have been sought related to the slack of the tendons. Moreover, the distributed implementation of the control system, i.e., the inverse kinematics in the user interface module and tendon length control in the firmware, allows for multi-thread computation parallelization of the control system. Such a multi-thread parallelization can be crucial in reaching the small time-lag.

The stepper motors can be replaced with servo-motors to facilitate dynamic torque control on the catheter.

Force Control

A. Interaction Model

Figure 20:
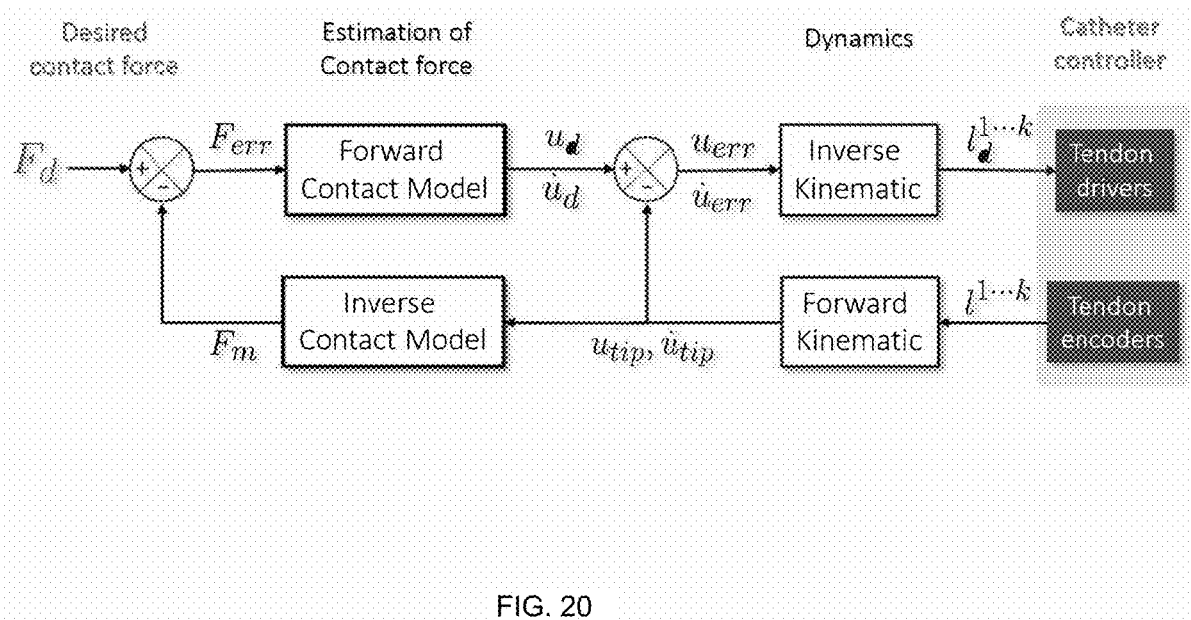
FIG. 20 illustrates a contact force control scheme according to an embodiment.

The proposed force control schema is depicted in FIG. 20. The catheter was assumed to be in an initial contact with the tissue and the force control schema was based on finding the desired indentation depth, $u_d$, to generate a desired force, Fa, from the catheter-tissue contact model. The contact model is a generalized Kelvin-Voigt (GKV) viscoelastic model with three GKV units and with the nonlinearity power of p=5. The displacement-based contact model is presented in Eq. 24 representing Eq. 6 above.

$$Kx(t) + C\dot{x}(t) = -f(t), \qquad (24)$$

where, K and C are the stiffness and viscous friction material matrices, f(t) s the contact force, and $x(t)=(u(t)\times 1(t)\times 2(t)\times 3(t))^T$ is the state displacements. u(t) replacing $x_0$ in the previous equations.

The force-contact model necessitates parameter identification to obtain the tissue-specific material matrices. To this end and to simulate the myocardial tissue, a 14 mm-thick sheet of viscoelastic silicon-rubber material with shore hardness of 20-00 (Ecoflex™ 00-20, Smooth-on Inc., PA, USA)

was fabricated. Same material has been used in similar studies as myocardial tissue phantom. Adopting the optimization schema described above, the mechanical properties of the phantom tissue, i.e., contact model parameters, were identified with a goodness-of-fit of R2=0.94% and root-mean-square (RMS) error of 0.03±0.02 (Eq. 25-26).

$$K = \begin{pmatrix} 0.25 & 0 & 0 & 0 \\ -0.47 & 0.47 & 0 & 0 \\ 0 & -0.52 & 0.52 & 0 \\ 0 & 0 & -0.74 & 0.73 \end{pmatrix} \frac{N}{mm} \quad (25)$$

$$C = \begin{pmatrix} 0 & 0 & 0 & 0 \\ -16.46 & 16.46 & 0 & 0 \\ 0 & -8.72 & 8.72 & 0 \\ 0 & 0 & -1.98 & 1.98 \end{pmatrix} \frac{Ns}{mm} \quad (26)$$

B. Catheter Tip Position Control

For the experimental tests, a spring-loaded catheter with silicon rubber body was fabricated with 40 mm length and 6 mm diameter. These dimensions were selected so as to cover the required workspace inside the right atrium. Precise controlling the catheter tip to reach a desired indentation state, $(u_d, u'_d)^T$, was essential for the force control. Therefore, a neural network learning-based schema was adopted to determine the desired length of each tendon, $(1_d^{1-4}, 1'_d{}^{1-4})^T$, for a given desired indentation depth, $(u_d, u'_d)^T$. The desired indentation depth, i.e., as tip position $(0, -u_d(t), 0)^T$ is the input to the neural network and the tendons length were the output. The fitting was performed between the input and output using a fully connected architecture with ten hidden layers and five nodes per layer. The training dataset was based on the Cartesian feasible space described above. The cross-validation showed a goodness-of-fit of R2=0.98 for the neural network fitting.

C. Force Estimation and Control

For a given desired force, Fd, Eq. 24 was solved incrementally for a time step of δt. The incremental expression of Eq. 24 was $$x(t + \delta t) = x(t) - \delta t C^{-1}\big((0 F_d 0)^T + Kx(t)\big) \quad (27)$$

The time step was determined in real-time as the absolute time difference between two indentation evaluations. Time step was constant 0.01 s as the indentation refresh frequency was set to 100 Hz in the control loop. The refresh rate can be up to 10 kHz depending on the choice of appropriate hardware and software. Feeding the updated $u_d(t+\delta t)$ to the tendon length control loop, the RCI system would follow the incremental changes in the tendon lengths. Also, as for calculating the force feedback for compensation, Eq. 27 would be directly evaluated with the current lengths of the tendons $l_k$, (k=1-4) and estimated force Fm would be compared with the desired force for compensation. For the control, proportional-integral-derivative (PID) controller, impedance controller, robust controller, or predictive controller, or other model-based or non-model-based controllers can be used without changing the proposed framework. Furthermore, the apparent compressive stiffness of the phantom tissue was estimated as kt=0.10 Nmm−1 using Eq. 28, while a cantilever bending test showed that the bending stiffness of the catheter at its tip was kb=1.1Nmm−1. The comparison validated the negligible contact-induced bending deflection of the catheter.

$$k_t = \left(\sum_{i=0}^{3} \frac{1}{K_{ii}}\right)^{-1} \quad (28)$$

Experimental Validation

A. Experimental Setup

The control system was implemented in parallel in two Arduino Uno microprocessors hooked to four rotational encoders for the tendons length feedbacks and stepper motor driving. Also, the neural network and image acquisition systems (used for documentation) were implemented in the user interface in .Net C #environment. Also, a six-DoF ATI Mini40 force sensor was used as the benchmark for the comparison. Moreover, a linear motor was used to change the height of the phantom tissue to simulate the motion of the heart. Two markers, red and blue, were used to measure the relative distance of the catheter tip (as a measure of indentation) in real-time.

B. Experiment I: Constant Force

Figure 17:
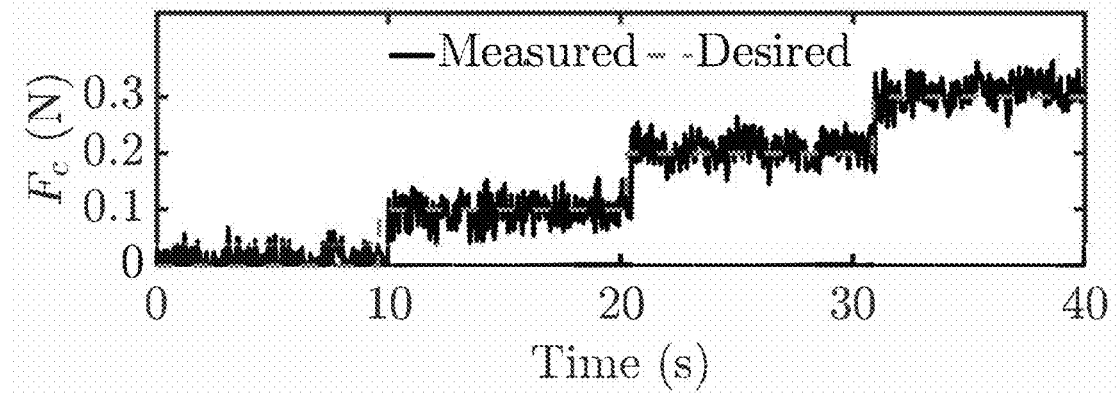
FIG. 17 illustrates a desired force and the desired force for Experiment I in accordance with an embodiment.

To test the system, three validation studies were performed. In the first study, the desired force value was changed from 0N to 0.1, 0.2, and 0.3N at 10 s intervals. The system would change the indentation depth autonomously to achieve the desired force. FIG. 17 shows the desired and achieved contact forces for Experiment I. The system exhibited fair following of the desired input with an RMS-error of 0.03±0.02 N. Also, the maximum absolute error was 0.07 N. Moreover, the output shows a lag of 0.24 s at the stepping times, i.e., 10 s, 21 s, and 32 s.

C. Experiment II: Sinusoidal Force

Figure 18A:
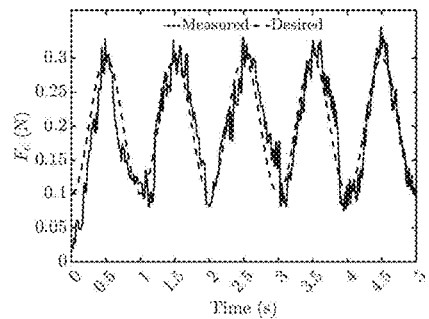
FIGS. 18a, 18b and 18c illustrate the desired versus the achieved contact force for 0.5 Hz, 1 Hz, and 1.5 Hz sinusoidal input in accordance with an embodiment.
Figure 18B:
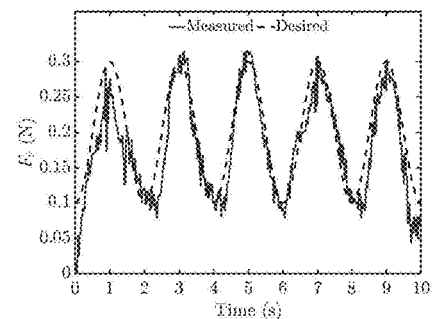
Figure 18C:
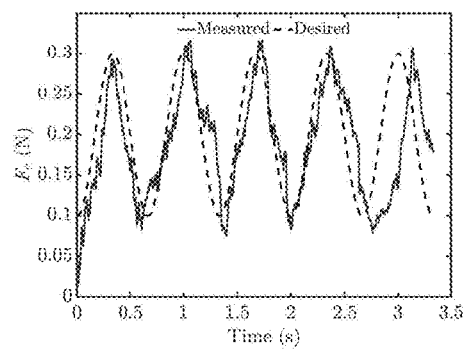

In the second experiment, the desired force was sinusoidal with 0.5, 1, and 1.5 Hz frequency, 0.2N mean, and 0.1N amplitude. These frequencies were selected to cover the lower bound and upper bound of the arrhythmatic heart beating frequencies, i.e., 30 and 90 beat-per-minute, respectively. FIGS. 18a, 18b and 18c depict the desired and achieved forces for, respectively, 0.5 Hz, 1 Hz, and 1.5 Hz sinusoidal input. The RMS-error for 0.5, 1, and 1.5 Hz inputs were 0.04±0.02, 0.03±0.02, and 0.05±0.03 N, respectively, while the maximum errors were 0.06, 0.07, and 0.15 N, respectively. The average lag time estimated at the peaks of the curves were 0.13, 0.27, and 0.31 s, respectively.

D. Experiment III: Constant Force on a Moving Tissue

Figure 19A:
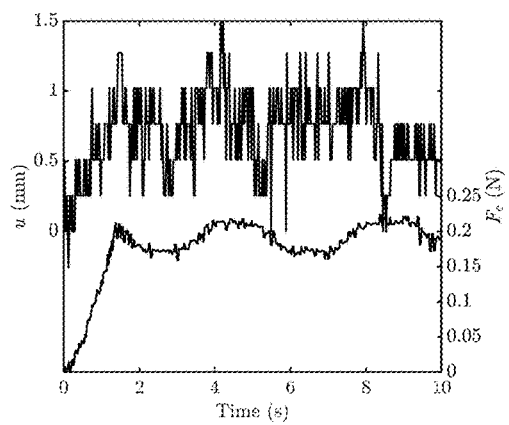
FIGS. 19a and 19b illustrate Results of force control while the contacting phantom tissue moves sinusoidally with 1 Hz, and 1.5 Hz frequency an in accordance with an embodiment.
Figure 19B:
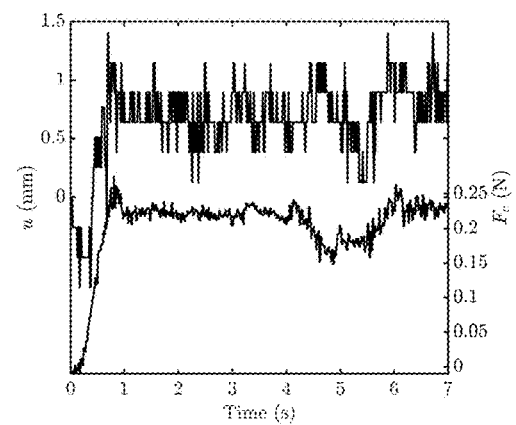

In the third study, the linear stage was moved sinusoidally with 1 and 1.5 Hz frequency and 10 mm amplitude. This study was to simulate the heart motion. As in practice, ultrasound imaging is available and the heart motion is monitored, video imaging was used as a replication of the ultrasound. The objective of the third study was to achieve and maintain a constant desired force of 0.2N. FIGS. 19a and 19b show the achieved contact force and indentation depth (obtained from the video cameras) while the contacting phantom tissue moves sinusoidally with 1 Hz, and 1.5 Hz frequency, respectively. The system achieved the average force of 0.19N and maintained it with ±0.04 N variation for 1 Hz and achieved 0.23 N and maintained ±0.04 N for 1.5 Hz test.

Summary

The aim of this part was to propose and validate a sensor-free force control schema for tendon-driven ablation catheters. The validation results showed that the system was capable of controlling the contact force with an average rms-error of 0.04±0.05N for constant and sinusoidal desired forces and with 0.02±0.04 N RMS-error on the moving sample. Since the required control range of the force is 0.2±0.1N, the performance is acceptable for the intended application.

What is claimed:

1. A system for applying a desired force to a body part, the system comprising:
   a controller for controlling a medical instrument, the medical instrument comprising a plurality of tendons embedded therein for controlling a position of a tip of the medical instrument; and
   a computing device comprising:
      a processor; and
      a non-transitory storage medium operatively connected to the processor, the non-transitory storage medium comprising computer-readable instructions;
   the processor, upon executing the instructions, being configured for:
      receiving the desired force to be applied by the tip of a medical instrument to a tissue of the body part, the tip being at an initial point of contact with said tissue;
      determining a desired indentation depth of the tip of the medical instrument corresponding to said desired force using a first force-contact model of the tissue;
      determining a desired position for the tip of the medical instrument based on the desired indentation depth;
      determining a desired configuration of the medical instrument based on the desired position using a first kinematic model, the desired configuration comprising an identification of at least a given one of the tendons and for each of the at least the given one of the tendons, a desired length and a desired tension;
      manipulating, via the controller, the at least the given one of the tendons to setup the desired configuration;
      measuring an actual configuration of the medical instrument comprising an actual length and an actual tension for each of the at least the given one of the tendons;
      when at least one of the actual length is different from the desired length and the actual tension is different from the actual tension:
         determining a corrected desired configuration based on the actual length, the actual tension and a predefined position of the tip in free space corresponding to the actual length and the actual tension; and
         manipulating, via the controller, the at least a given one of the tendons to setup the corrected desired configuration.

2. The system of claim 1, wherein said determining the corrected desired configuration comprises:
   determining an actual position of the tip using a second kinematic model;
   determining an actual indentation depth using the actual position and the predefined position of the tip in free space corresponding to the actual length and the actual tension;
   determining an estimated force corresponding to the actual indentation depth using a second force-contact model of the tissue;
   correcting the desired force using the estimated force, thereby obtaining a corrected desired force;
   determining a corrected desired indentation depth of the tip of the medical instrument corresponding to the corrected desired force using the first force-contact model of the tissue;
   determining a corrected desired position for the tip of the medical instrument based on the corrected desired indentation depth and the actual position of the tip; and
   determining the corrected desired configuration of the medical instrument based on the corrected desired position using the first kinematic model, the corrected desired configuration comprising a corrected desired length and a corrected desired tension.

3. The system of claim 1, wherein the predefined position of the tip in free space is determined using an artificial intelligence model trained to map positional coordinates of the tip of the medical instrument to tendons lengths and tendons tensions.

4. The system of claim 1, wherein the first force-contact model is a forward force-contact model and the second force contact model is an inverse of the first contact model and wherein the first force contact model is based on a non-linear viscoelastic contact model at an interaction point between the tip of the medical instrument and the tissue using a non-linear element and a plurality of Kevin-Voigts units.

5. The system of claim 1, wherein the first kinematic model is based on an inverse kinematic model and the second kinematic model is a forward kinematic model.

6. The system of claim 5, wherein the first kinematic model is based on an artificial intelligence model comprising:
   a learning-based classifier trained to map a given position within a task space of the tip of the medical instrument to a class of tendons identifying selected tendons to be manipulated for the tip to reach the given position;
   a regressor trained to determine a configuration of the medical instrument based on the class of tendons and the given position, the configuration determining a length and a tension of each of the selected tendons identified by the class of tendons to reach the given position.

7. The system of claim 1, further comprising the medical instrument, the medical instrument comprising a catheter, and the tendons being internally connected to the tip of the catheter.

8. The system of claim 7, wherein the catheter comprises a handle, and the controller is located on said handle and wherein the controller comprises one of a knob and a slider for setting a force to be applied by said catheter.

9. The system of claim 8, wherein the handle comprises:
   one of servo-motors and stepper motors for controlling the length and the tension of each of the tendons; and
   tendons encoders for measuring a current length and a current tension of each of the tendons.

10. A method for applying a force to a body part, the method comprising:
    receiving, at a processor, a desired force to be applied by a tip of a medical instrument to a tissue of the body part, the medical instrument comprising a plurality of tendons embedded therein for controlling a position of the tip and being controlled by a controller, the tip being at an initial point of contact with said tissue;

determining, by the processor, a desired indentation depth of the tip of the medical instrument relative to said initial contact point based on said desired force using a first force-contact model of the tissue;

determining, by the processor, a desired configuration of the medical instrument based on the desired indentation depth using a first kinematic model, the desired configuration comprising an identification of selected tendons and for each of the selected tendons, a desired length and a desired tension and wherein the desired indentation depth is provided as input to said first kinematic model;

setting up, via the controller, the desired configuration for the medical instrument;

measuring an actual configuration of the medical instrument comprising an actual length and an actual tension of the selected tendons;

determining, by the processor, an actual position of the tip of the medical instrument based on said actual configuration using a second kinematic model;

determining, by the processor, an actual indentation depth within said tissue based on a differential between said actual position of the tip and a position of the tip in free space corresponding to said actual length and said actual tension of the selected tendons; and determining, by the processor, an actual force applied to said tissue based on the determined actual indentation.

11. The method of claim 10, further comprising activating, by the processor, a control loop to reduce a differential between the desired configuration and the actual configuration.

12. The method of claim 11, wherein the control loop comprises:
a first loop for inputting a differential between the desired force and the actual force to said first force-contact model of the tissue to output a correction of the desired position of the tip; and
a second loop for inputting a differential between the actual position of the tip and the correction of the desired position of the tip to the first kinematic model to output a corrected configuration of the medical instrument.

13. The method of claim 12, further comprising activating, by the processor, the control loop to setup the corrected configuration of the medical instrument.

14. The method of claim 10, wherein the medical instrument is a catheter, and the tendons are internally connected to the tip of the catheter.

15. A system for applying a force to a body part, the system comprising:
a controller for controlling a medical instrument, the medical instrument comprising a plurality of tendons embedded therein for controlling a position of a tip of the medical instrument; and
a computing device comprising:
a processor; and
a non-transitory storage medium operatively connected to the processor, the non-transitory storage medium comprising computer-readable instructions;
the processor, upon executing the instructions, being configured for:
determining, using a first force-contact model, a desired indentation depth of the tip of the medical instrument from a received desired force, wherein the tip is at an initial point of contact with said tissue;
generating, using a first kinematic model, a desired configuration from said desired indentation, the desired configuration comprising an identification of selected tendons and for each of the selected tendons, a desired length and a desired tension;
setting up, via the controller, said desired configuration for the medical instrument and measuring an actual configuration of the medical instrument, wherein said actual configuration comprises an actual length and an actual tension of the selected tendons;
determining, using a second kinematic model, an actual position of the tip based on said actual configuration;
determining an actual indentation depth based on a differential between said actual position of the tip and a position of the tip in free space corresponding to said actual length and said actual tension of the selected tendons; and
estimating, using a second force-contact model, an actual force applied to said tissue based on the determined actual indentation depth.

16. The system of claim 15, wherein the first force-contact model operates in a forward mode, the second force-contact model operates in an inverse mode, the first kinematic model operates in an inverse mode and the second kinematic model operates in a forward mode.

17. The system of claim 16 wherein the first force-contact model further receives a differential between the desired force and the actual force to adjust the desired indentation depth.

18. The system of claim 16, wherein the processor is further configured for determining a desired position of the tip based on the desired indentation depth.

19. The system of claim 18, wherein the processor is further configured for receiving a differential between the desired position of the tip and the actual position of the tip to adjust the desired configuration.

20. The system of claim 15, further comprising the medical instrument, the medical instrument comprising a catheter, and the tendons being internally connected to the tip of the catheter.

* * * * *